United States Patent [19]
Vukovich et al.

[11] Patent Number: 5,484,354
[45] Date of Patent: Jan. 16, 1996

[54] CONTROLLED CAPACITY TORQUE CONVERTER CLUTCH CONTROL SYSTEM

[75] Inventors: William J. Vukovich, Ypsilanti; Melissa M. Koenig, Ann Arbor, both of Mich.

[73] Assignee: General Motors Corporation, Detroit, Mich.

[21] Appl. No.: 298,962

[22] Filed: Sep. 2, 1994

[51] Int. Cl.$^6$ .................................................. B60K 41/02
[52] U.S. Cl. .......................... 477/174; 477/169; 477/176; 477/180; 192/3.3
[58] Field of Search .................................... 477/169, 176, 477/180, 118, 174, 168, 175; 192/3.3

[56] References Cited

U.S. PATENT DOCUMENTS

| | | | |
|---|---|---|---|
| 4,582,185 | 4/1986 | Grimes et al. | 477/176 X |
| 4,706,790 | 11/1987 | Lockhart et al. | 477/176 X |
| 5,086,894 | 2/1992 | Iizuka et al. | 477/176 X |
| 5,314,050 | 5/1994 | Slicker et al. | 477/175 X |
| 5,378,211 | 1/1995 | Slicker et al. | 477/175 |

Primary Examiner—Rodney H. Bonck
Assistant Examiner—Peter Kwon
Attorney, Agent, or Firm—Vincent A. Cichosz

[57] ABSTRACT

A torque converter clutch control system has a plurality of operating modes among them an off mode wherein torque coupling is fluidic, a controlled capacity mode wherein the torque coupling is fluidic and mechanical during period of positive engine torque, an apply mode for smoothly transitioning from the OFF mode to the controlled capacity mode, and a release mode for smoothly transitioning from the controlled capacity mode to the off mode. Additionally, a lock mode is provided wherein torque coupling is mechanical via the torque converter clutch and a coast mode wherein torque coupling is mechanical and fluidic during periods of negative torque.

6 Claims, 19 Drawing Sheets

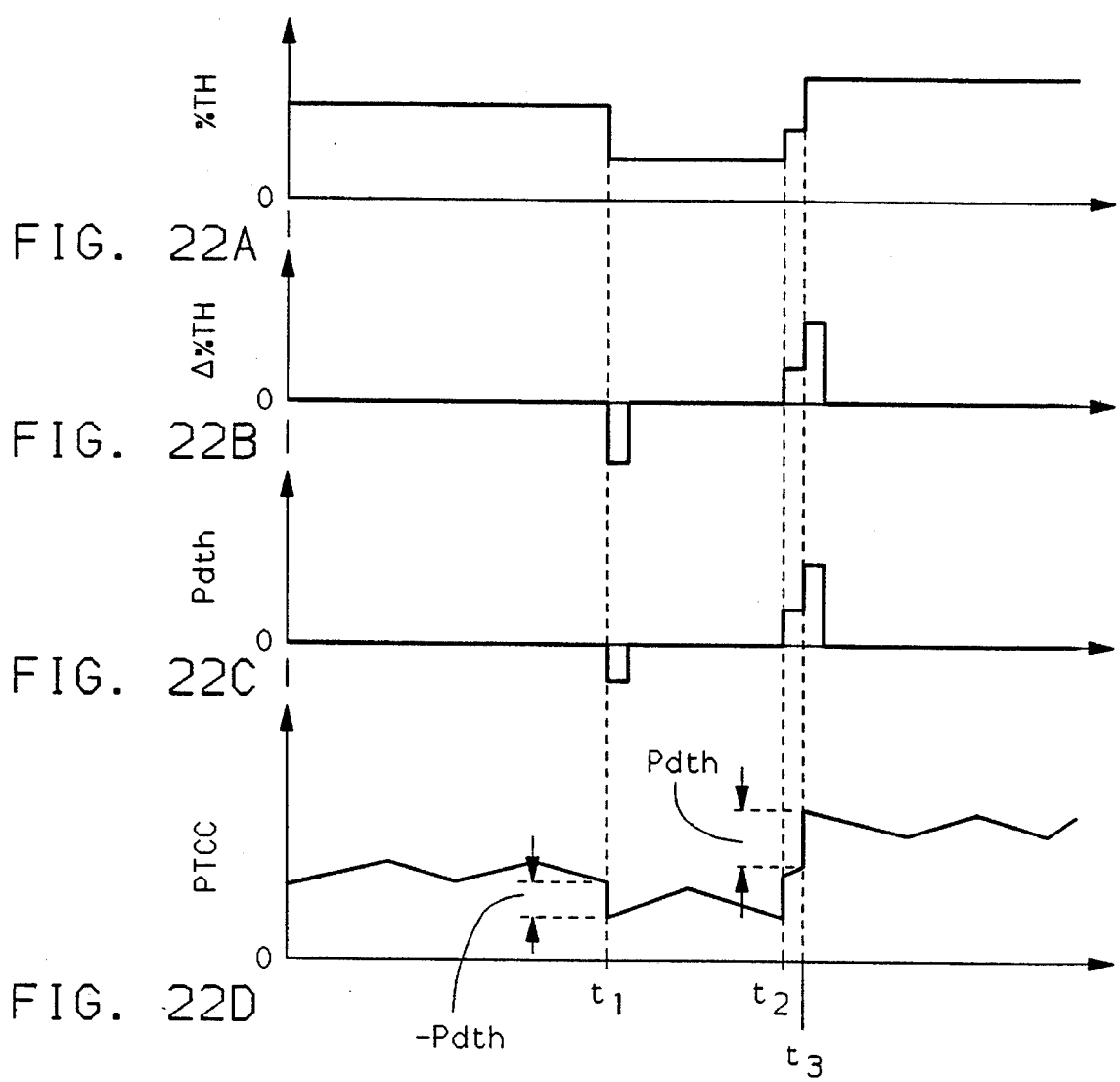
FIG. 22A
FIG. 22B
FIG. 22C
FIG. 22D
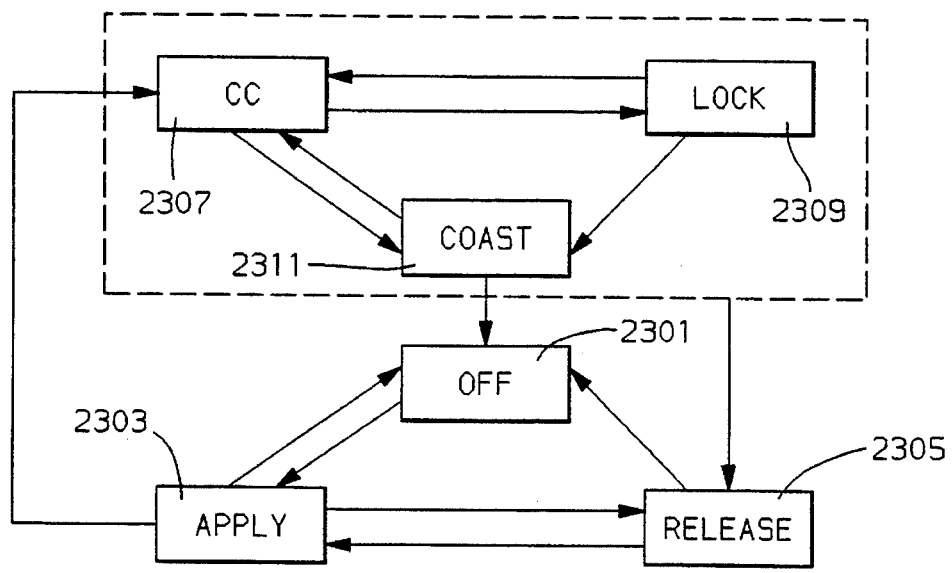
FIG. 23

CONTROLLED CAPACITY TORQUE CONVERTER CLUTCH CONTROL SYSTEM

BACKGROUND OF THE INVENTION

This invention relates to a control of a torque converter clutch and more particularly to a system for regulating the torque capacity of the clutch to control the torque converter slippage.

Introduced as an efficiency increasing device, the torque converter clutch is a fluid operated friction device engageable to couple the impeller (input) and turbine (output) of a hydraulic torque converter. In the usual application, the clutch is either fully released to permit unrestrained slippage between the impeller and the turbine or fully engaged to prevent such slippage entirely. An unfortunate aspect of full converter clutch engagement is that the engine torque perturbations or torsionals normally absorbed by the torque converter are passed directly through the clutch to the vehicle drivetrain and may produce annoying pulsations therein if not properly damped. This factor operates to restrict the usage of the torque converter clutch to specified vehicle operating conditions for which the annoying effects are minimized. As a result, the potential efficiency gains afforded by engagement of the torque converter clutch have only been realized over a portion of the range of vehicle operation.

To overcome the disadvantages of torque converter clutch engagement, it has been proposed to operate the clutch in a slipping mode wherein a predetermined amount of slippage between the torque converter impeller and turbine is permitted for regulating the torque capacity of the clutch. In any such system, the objective is to isolate engine torque perturbations in the torque converter while passing steady state engine torque at a slip rate that provides improved torque converter efficiency. One such system that controls the clutch slippage to achieve the above objectives is disclosed in U.S. Pat. No. 4,582,185 to Grimes et al., issued Apr. 15, 1986 and assigned to the assignee of the present invention.

Generally speaking, the system identified above operates to generate clutch engagement force without regard to the magnitude of the slip error. Whenever the measured slip is greater than the desired slip, the controller acts to increase the clutch engagement force to increase the torque capacity of the clutch. Whenever the measured slip is less than the desired slip, the controller acts to decrease the clutch engagement force to decrease the torque capacity of the clutch.

While the control of the torque converter clutch in a slip mode may be desirable over a significant range of various driving conditions, further refinements to the torque converter clutch control can be made to improve overall efficiency. For example, full torque converter clutch engagement whereby slip is substantially zero may be acceptable during periods of vehicle operation where torque disturbances are not expected to be objectionable. Typically, highway cruising with nominal vehicle loading and sufficient engine speed may benefit from such full engagement of the torque converter clutch. However, as loading and engine speed vary, torque disturbances may become objectionable and release of full engagement desirable. Both the application and release of a torque converter clutch into or out of a full engagement may themselves become objectionable particularly where engine load or speed conditions vary.

SUMMARY OF THE INVENTION

The present invention is directed toward a control for a torque converter clutch (TCC). In particular, the control is operative to effectuate operation within and transitions between a plurality of operating modes. In general, the control comprises: an OFF mode wherein the TCC is fully disengaged and all torque transfer between the input and output members is fluidic; and APPLY mode wherein the TCC gains capacity and torque transfer between the input and output members is mechanical and fluidic; a controlled capacity mode (CC mode) wherein a predetermined amount of slip is maintained at the TCC and positive torque coupling is mechanical and fluidic; and, a RELEASE mode wherein the TCC loses capacity and torque transfer between the input and output members is mechanical and fluidic. Additionally, the control comprises a LOCK mode wherein positive torque coupling is mechanical and a COAST mode wherein positive and negative torque coupling is mechanical and fluidic.

In accordance with a first aspect of the present invention, a control means for establishing a pressure control signal has associated therewith a plurality of inputs used to determine the desired mode of operation. An off mode of operation provides for a minimal pressure differential across the clutch actuating mechanism to thereby provide substantially zero mechanical torque capacity of the TCC. The APPLY mode is operable to smoothly transition from the OFF mode to the CC mode by increasing the torque capacity of the TCC during periods of positive torque. The CC mode is operative after the APPLY mode has diminished the slip across the TCC and effectively controls the slip to a predetermined reference slip by varying the pressure control signal in response to both positive engine torque and slip deviation from a reference slip. The RELEASE mode is operable to smoothly transition from the CC mode to the OFF mode by decreasing the torque capacity of the TCC.

According to another aspect of the present invention, a LOCK mode of operation is accessible from the CC mode to provide a pressure control signal which varies in response to engine torque to maintain torque capacity at least as great as the torque being transmitted between the input and output of the torque converter. Further, a controlled release may be instituted from the LOCK mode to smoothly transition into the OFF mode.

Another aspect of the invention provides for TCC capacity control during periods of vehicle coast wherein torque being transferred may be negative. Preferably, torque capacity is controlled in response to a drivetrain member speed quantity.

Yet another aspect of the present invention provides for an APPLY mode wherein the pressure control signal is established as the summation of a quantity established in accordance with the engine torque and varying in relation thereto thereby contributing either positively or negatively to the pressure control signal and a signal which varies in a single direction only to contribute positively to the pressure control signal. The result of APPLY mode control in this fashion ensures that steady state torque variations during the apply will neither increase the apply time to unacceptable levels nor cause too swift an application or potential unintended lock-up.

Still another aspect of the present invention adapts the pressure control signal to transient throttle conditions by summing therewith a quantity corresponding thereto which contributes negatively to the torque capacity whereby during aggressive positive throttle and aggressive negative throttle an additional margin of slip is provided to allow for increased fluid coupling and decreased likelihood of unintended lock-up respectively.

These and other aspects of the present invention are more thoroughly understood by the following description.

BRIEF DESCRIPTION OF THE DRAWINGS

FIGS. 22A, 22B and 22C depict the operation of the control system with respect to certain high rates of change in throttle position.

FIG. 23 illustrates an overall control system including modes of operation and transition paths according to the present invention.

DETAILED DESCRIPTION OF THE DRAWINGS

Figure 1:
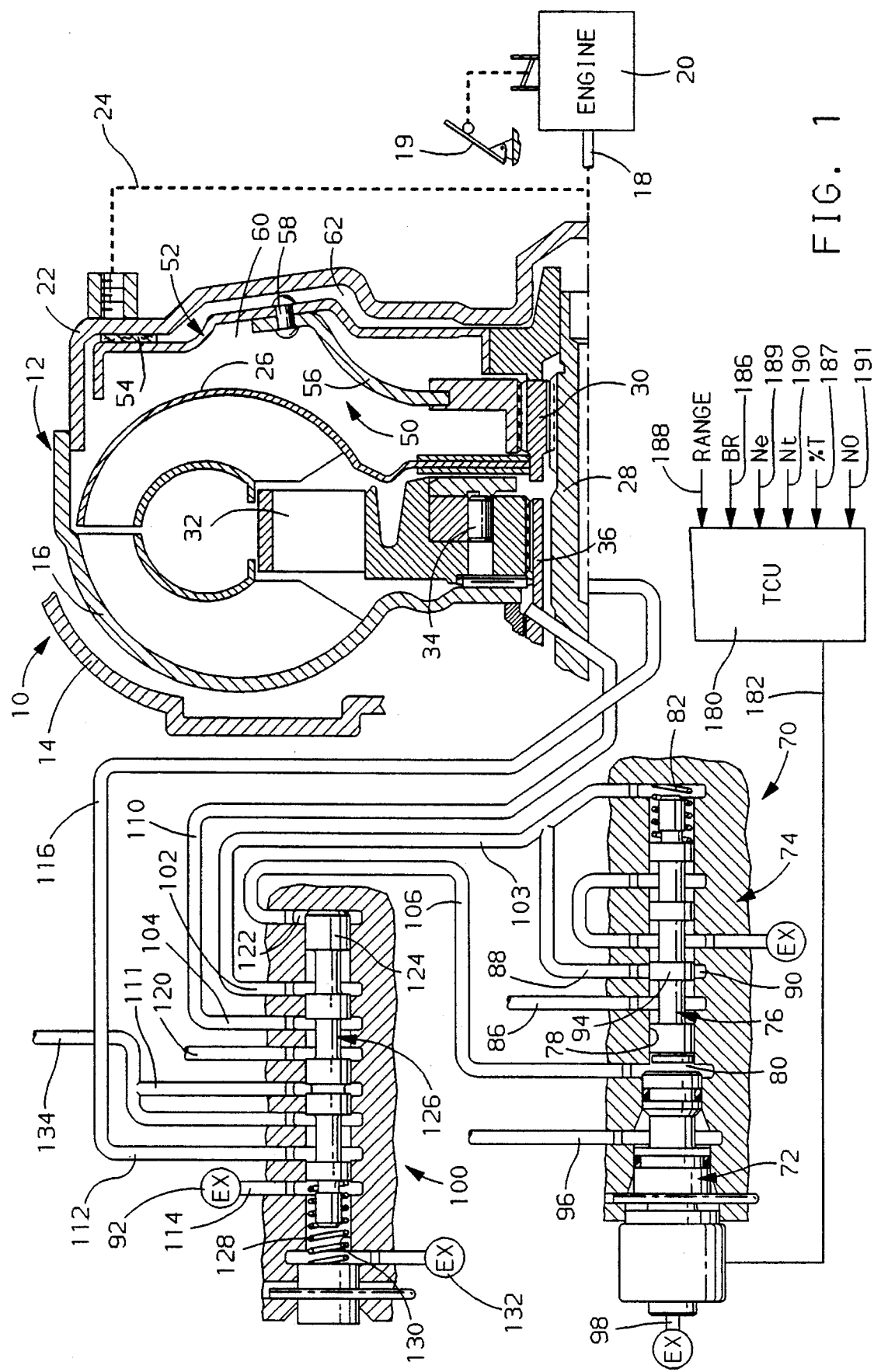
FIG. 1 is a schematic and cross-sectional diagram depicting the torque converter clutch, certain transmission fluid handling elements, and a microcomputer-based control unit for carrying out the control functions of this invention.

Referring now to FIG. 1, reference numeral 10 generally designates a portion of an automatic transmission including a conventional fluidic torque converter 12 disposed within the transmission housing 14. the impeller or input member 16 of torque converter 12 is connected to be rotatably driven by the output shaft 18 of engine 20 through the input shell 22, as indicated by the dashed line 24. The turbine or output member 26 of the torque converter 12 is rotatably driven by the impeller 16 by means of fluid transfer therebetween, and is connected to rotatably drive the torque converter output shaft 28 through a splined hub member 30. The stator 32 redirects the fluid coupling impeller 16 to the turbine 26 and is connected through a one-way device 34 and a splined sleeve shaft 36 to the transmission housing 14. The converter output shaft 28 is mechanically coupled to a suitable gear set for providing a plurality of distinct speed ratios between the converter output shaft 28 and the transmission output shaft.

Also disposed within the transmission housing 14 is a torque converter clutch (TCC) assembly, generally designated by the reference numeral 50. Clutch 50 includes a clutch plate 52 having a friction surface 54 and a drive disc 56 coupled for rotation to clutch plate 52 by rivet connector 58. The drive disc 56 and plate 52 are axially slidable on hub member 30, and the drive disc 56 is splined onto hub member 30 so that the engagement of friction surface 54 of clutch plate 52 with the input shell 22 provides a mechanical drive between the input shell 22 and the converter output shaft 28.

Clutch plate 52 divides the space between turbine 26 and input shell 22 into two fluid chambers; an apply chamber 60 and a release chamber 62. When the fluid pressure in the apply chamber 60 exceeds that in the release chamber 62, there is a resultant force which tends to move the friction surface 54 into engagement with input shell 22. Such force tends to reduce the slippage between the impeller 16 and turbine 26 and when sufficiently great, fully engages the clutch 50 to prevent such slippage entirely. When the fluid pressure in release chamber 62 exceeds that in apply chamber 60, there is a resultant force which tends to move the friction surface 54 out of engagement with input shell 22. Such force tends to increase the slippage between impeller 16 and turbine 26, and when sufficiently great fully releases the clutch 50 to permit unrestrained slippage therebetween. The vehicle drivetrain as referenced herein shall include all mechanical elements from the output member 26 and/or clutch plate 52 through the final drive components (not shown).

The input shell 22 has splined thereto a pump drive shaft, not shown, which extends coaxial with and through converter output shaft 28 and which is mechanically connected to drive a positive displacement hydraulic pump (not shown). The pump supplies hydraulic fluid from a fluid reservoir to the torque converter 12, the transmission control valves, the various clutches and brakes of the transmission gear set, and the transmission lubrication and cooling systems. The pump is preferably of a variable displacement design, such as that shown in the U.S. Pat. No. 4,342,545 to Schuster issued Aug. 3, 1982, and assigned to the assignee of the present invention; however, a fixed displacement pump will perform satisfactorily. A pressure regulator valve regulates the fluid pressure from the pump (hereinafter referred to as line pressure). The foregoing description of TCC mechanics and operation are generally well known in the art.

The control system of this invention operates as described below to control the fluid pressure in the apply and release chambers 60 and 62 to control the amount of slippage between the impeller 16 and the turbine 26. As such, the remainder of the elements depicted in FIG. 1 are devoted at least in part to such purpose.

The regulator valve 70 comprises an integral solenoid valve 72 and spool valve 74, the spool 76 being linearly displaceable within the valve bore 78 through energization of the solenoid coil. A spring 82 biases the spool 76 leftward to the position shown in FIG. 1. When the solenoid coil is energized, chamber 80 is pressurized to overcome the spring force thereby displacing the spool to the rightward position.

The inlet port 86 is supplied with the transmission main or line pressure, and the port 88 is a controlled pressure port. When the spool 76 is in the spring biases position as illustrated in FIG. 1, the spool land 94 blocks the controlled pressure port 88 and the inlet port 86 is decoupled therefrom. When the spool valve 76 is in the solenoid valve biased position, the spool land 94 no longer blocks the controlled pressure port 88, and the line pressure port 86 is coupled thereto. In operation, the solenoid coil is pulse-width modulated (PWMed) at a variable duty cycle to shift the spool 76 between the two positions to effect a ratiometric pressure control as explained below.

Control valve 100 connects the regulator valve 70 to the apply and release chambers 60 and 62 of the torque converter clutch mechanism 50. The controlled pressure port 88 is connected to the control valve port 102 via line 103. The control valve ports 110 and 112 are connected to the apply and release chambers respectively. Line 106 is connected to a bias chamber 122 of directional valve 100 so that the pressure in line 106 acts on the land 124 of spool 126. A spring 128 disposed within the spool sleeve 130 exerts a rightward force in opposition to the leftward force of the pressure in bias chamber 122. The area of the valve surrounding spring 128 is exhausted via exhaust port 132.

When the solenoid coil of solenoid valve 72 is completely deenergized, lines 106 and chamber 80 are exhausted through port 98, line 96 is disconnected from therefrom and spool 126 assumes the spring biased position illustrated in FIG. 1. In this configuration, a regulated converter feed pressure in line 134 is supplied to the clutch release chamber 62 via control valve port 112 and line 116, and the apply chamber pressure is diverted to the cooler (not shown) via port 120. This moves the clutch plate 52 away from the input shell 22, disengaging clutch 50 and supplying operating pressure to the torque converter impeller 16. In this state, normal torque converter operation is achieved.

When it is desired to apply the torque converter clutch 50, the solenoid coil of solenoid valve 72 is intermittently energized by PWM. This produces a PWM pressure in line 106 in accordance with the pressure in line 96 and the PWM duty cycle. When the PWM duty cycle is relatively low, the resulting pressure in bias chamber 122 of control valve 100 is insufficient to overcome the bias force of spring 128. Consequently, the control valve is maintained in the release position (top position) of FIG. 1, and normal torque converter operation continues.

If the PWM duty cycle is increased, the pressure in the bias chamber 122 also increases. When the bias pressure force on land 124 exceeds the spring force, the spool 126 moves leftward to the position depicted by the lower portion of the spool in FIG. 1. The pressure and PWM duty cycle which produce the position change of the control valve 100 are referred to herein as the switch point pressure and switch point duty cycle.

In the control state configuration, the regulated converter feed pressure in line 134 is directed via port 111 and 120 to the cooler (not shown) and the controlled pressure is supplied to impeller 16 and clutch apply chamber 60 via control valve ports 102 and 104, lines 103 and 110, the regulator valve port 88 and valve bore 78. At the same time, the pressure in release chamber 62 is connected to the exhaust port 92 via control valve ports 112 and 114. At PWM duty cycles just above the switch point duty cycle, the apply chamber pressure is relatively low, resulting in relatively low net clutch engagement pressure. At relatively high PWM duty cycles, the apply chamber pressure is relatively high, resulting in relatively high net clutch engagement pressure.

The energization of the solenoid coil is controlled by an electronic transmission control unit (TCU) 180 via line 182. The control is made in response to a number of input signals including a brake signal (BR) on line 186, an engine throttle signal (% TH) on line 187, a transmission gear range signals (RANGE) on lines 188, an engine speed signal (Ne) on line 189, a turbine speed signal (Nt) on line 190 and a transmission output speed signal N(o) on line 191. The brake signal may be obtained with a switch mechanism (not shown) responsive to movement of the vehicle brake pedal such that depression of the bake pedal causes a change in the output state of the brake signal. The engine throttle signal may be obtained with a suitable transducer, such as a rotary potentiometer (not shown) responsive to the position of the accelerator pedal or engine throttle for producing an electrical output signal in accordance therewith. The transmission gear range signals may be obtained with suitable pressure transducers (not shown) located with respect to the fluid conducting passages of the transmission 10 in a manner to determine the gear range selected. The turbine speed (Nt), engine speed (Ne) and output speed (No) signals are obtained from conventional speed transducers such as the variable reluctance type which cooperate with magnetic gear teeth formed on the surface of a rotating shaft.

The (TCU) 180 essentially comprises a microcomputer (μC), an input/output (I/O) device, which communicates with the microcomputer via an address and control bus and a bi-directional data bus, and a high frequency clock for supplying the microcomputer with a high frequency pulse train for controlling the operational timing of the same. The microcomputer is preferably of the type including internal Random-Access-Memory (RAM), Read-Only-Memory (ROM) and timing circuitry. The brake, throttle, gear, engine speed, turbine speed and output speed signals on lines 186, 187, 188, 189, 190 and 191 are applied as inputs to the input/output device, and the input/output device includes circuitry for converting analog input signals to a digital format and for developing suitable control signals on line 182 for controlling the energization of the solenoid coil in response to duty cycle commands developed by the microcomputer. A flow diagram representative of suitable program instructions for performing the control functions of this invention is given in FIGS. 2–15.

The graphs shown in FIGS. 16–22 depict various features of the control of the present invention. In all figures wherein slip (ΔN) is illustrated, positive slip is shown by a solid trace above the zero axes and is indicative of the torque converter input member having a rotational speed in excess of the torque converter output member. This is the situation normally expected when steady state engine torque (hereinafter engine torque) is being provided to the vehicle drivetrain when the TCC is either disengaged or partially engaged. Torque in these situations is said to be positive. When slip is indicated as being negative as shown by a solid trace below the zero axis line in any figure, the torque converter output member has a rotational speed in excess of the torque converter input member. This is a condition found through periods of vehicle operation wherein the TCC is disengaged or partially engaged and the vehicle drivetrain is to some degree driving the vehicle engine. Torque in these situations is said to be negative.

The various pressure charts shown throughout FIGS. 16–22 depict the net fluid pressure in a control chamber of the TCC which is used to maintain a controlled degree of TCC engagement. The net fluid pressure represented by the solid lines labeled PTCC in the Figures, depending on the mode of operation, may be comprised of summations of various pressure quantities as will be developed at further points herein. These pressure graphs interchangeably may represent actual pressure within the control chamber of the TCC or a pressure control signal, for example a variable duty cycle supplied to a clutch controlled mechanism as illustrated in FIG. 1 previously described.

Beginning with reference to FIG. 23, a block diagram representation of the various modes of operation of an overall control system for the TCC is shown. The boxes 2301–2311 depict the various modes of operation available to the control system. The lines interconnecting the various boxes represent the transitions between modes of operation available to the control system. In the present control, the OFF mode represented by block 2301 is a priority mode which is selected when any one of a variety of OFF mode criteria would so indicate the desirability of complete TCC disengagement. For example, until a vehicle is operating in a steady state condition with respect to closed loop engine control at an appropriately high engine temperature, the OFF mode would be selected and engagement of the TCC would not be allowed even if other criteria otherwise associated with TCC application would so indicate its engagement. The remaining various modes of operation each have priorities of a lesser degree than the OFF mode, the various degrees of priority being represented in conjunction with the discussion of flow charts of FIGS. 2–15.

Assuming the OFF mode is a starting point for discussion of the overall system and transitions between modes, at a time when it is appropriate to exit the OFF mode wherein the TCC is completely disengaged and enter a mode of operation wherein the TCC is partially or fully engaged, the control of the present invention operates to allow TCC engagement through an APPLY mode of operation as represented by block 2303. During the APPLY mode of operation, the net fluid pressure in the control chamber in the TCC is increased at a predetermined rate until positive slip across the TCC reaches a predetermined slip threshold. After that threshold is reached, the CONTROLLED CAPACITY mode (hereinafter "CC mode") of operation as represented by block 2307 is entered. If at any time during the application of TCC via APPLY mode 2303 the OFF mode is chosen by any of the various criteria indicating the desirability of a total and immediate disengagement of the TCC, then the OFF mode 2301 is once again selected. Likewise, if during the APPLY mode 2303, the RELEASE mode is chosen by any of the various criteria indicating the desirability of a controlled release of the TCC, the RELEASE mode 2305 is selected.

Assuming operation within the CC mode 2307, the positive slip across the TCC is controlled by varying the net fluid pressure in the control chamber of the TCC in response to deviations in the measured slip from a predetermined reference slip. Preferably, the reference slip is determined as a function of a drivetrain member speed quantity. One such readily available quantity is at the torque converter output, or turbine, which advantageously has associated therewith the turbine speed signal (Nt). Alternatively, the transmission output speed signal (No) could be utilized but is not the preferred drivetrain member speed quantity. Where measured slip exceeds the reference slip, the control of the present invention serves to vary the fluid pressure in the control chamber to increase torque capacity of the TCC thereby reducing the measured slip toward the reference slip. All else being equal, this translates into an increase in the net fluid pressure within the control chamber. When the measured slip is less than the reference slip, the control of the present invention serves to vary the fluid pressure in the control chamber to decrease torque capacity of the TCC thereby increasing the measured slip toward the reference slip. All else being equal, this translates into a decrease in the net fluid pressure in the control chamber. This control methodology is described in detail in U.S. Pat. No. 4,582, 185 also assigned to the assignee of the present application. This is an appropriate control scheme if the engine torque is substantially constant throughout the CC mode of operation.

Such an engine torque situation would result in equivalent pressure changes per each control loop which, when accumulated over multiple control loops, results in a substantially linear ramp up and ramp down of net fluid pressure in response to clutch slip greater than and less than the reference slip respectively. However, experience has shown significant impact upon the ability of such a system to adequately control slip during periods wherein the engine torque deviates. For example, where engine torque increases significantly during a CC mode of operation, control of the torque converter slip by simple equivalent step adjustments may prove to be inadequate in controlling slip to the reference slip. Likewise, significant reductions in engine torque during periods of CC modes of operation may cause undesirable lockup of the TCC for similar reasons. The present invention therefore advantageously provides for a net fluid pressure in the control chamber of the TCC which is comprised of a first portion which has a predetermined correlation to engine torque and is responsive thereto, and a second portion which is a function of the slip deviation from the reference slip. Any of a variety of measurements of engine torque can be utilized including engine torque estimations based upon throttle position and calibration table look-ups, or real time engine torque calculations based on well known engine volumetric efficiency techniques.

Under circumstances appropriate for full application of the TCC, a LOCK mode of operation 2309 is entered. It is apparent from FIG. 23 that LOCK mode operation 2309 is accessible only from a CC mode of operation. While in the CC mode of operation, if measured slip remains less than a predetermined threshold for an appropriate amount of time, LOCK mode is cause to be entered. In accordance with the present embodiment, the initial net fluid pressure in the control chamber at the onset of the LOCK mode is equivalent to the terminal net fluid pressure at the end of the CC mode with the addition thereto of a fixed fluid pressure step thereby resulting in a net fluid pressure in the control chamber sufficient to increase the capacity of the TCC such that the slip is reduced to, and maintained at, zero. The fluid pressure step is chosen such that the net fluid pressure resulting from its addition to the terminal net fluid pressure in the CC mode will be marginally sufficient to cause full clutch engagement and zero slip speed. With such a calibrated amount of additional fluid pressure being marginally sufficient to reduce slip to zero, substantially large torque perturbations experienced during LOCK mode operation, which with a larger fluid pressure step would cause undesirable transmission of the torque perturbations through to the drivetrain, may advantageously be bypassed by virtue of the marginal fluid pressure step.

Preferably, while in the LOCK mode, the net fluid pressure is comprised of the summation of a pressure which has a predetermined correlation to steady state engine torque and a pressure which is a fixed value equivalent to the summation of a frozen terminal value of the accumulated fluid pressure adjustments made in the CC mode and the fluid pressure step. The net fluid pressure in the lock thereby varies in accordance with steady state engine torque variations. Upon conditions indicative of the desirability of returning to the CC mode from the LOCK mode of, the lock step fluid pressure is removed from the net fluid pressure at the termination of the LOCK mode thereby resulting in an initial net fluid pressure in the CC mode comprised of a portion having a predetermined correlation to engine torque and a portion equivalent to the frozen terminal value of the accumulation of fluid pressure adjustments made in the previous CC mode. Accumulation of fluid pressure adjustments will continue in the CC mode beginning with the frozen terminal value and accumulating adjustments thereto.

Yet another mode of operation, a COAST mode 2311, is available for access from the CC mode or the LOCK mode. Conventional TCC control would release fully the TCC in the event of moderate throttle releases. The control of the present invention provides for a COAST mode wherein torque capacity is controlled between the input and output members of the TCC during periods of partial or full throttle releases. Through these periods of vehicle operation, a couple of clear advantages are provided by such a control method. Firstly, through periods of vehicle coast wherein the operator resumes the previous throttle setting, since slip is being controlled to a predetermined slip there is no need to cycle through an APPLY mode and transition to CC mode is more direct and efficient. Secondly, where the vehicle driveline is coupled to the vehicle engine thereby providing negative torque thereto, engine fueling requirements for sustaining idle are significantly reduced. The COAST mode therefore contributes to fuel economy by reducing idle fuel requirements and providing for increased operation time in the CC mode. If the TCC were fully applied through periods of vehicle coast, undesirable driveline disturbances would be introduced when the operator resumes a positive torque producing throttle setting. Therefore, without the control of the present invention whereby TCC capacity is controlled during periods of vehicle coast, the fuel economy afforded thereby would be available only at the expense of undesirable driveline disturbances.

From FIG. 23, it is clear that the OFF mode, as previously mentioned as having priority over all other modes, is accessible from all of the various modes of operation. Additionally, the RELEASE mode is accessible from all modes wherein the TCC has some degree of torque carrying capacity.

Figure 16A:
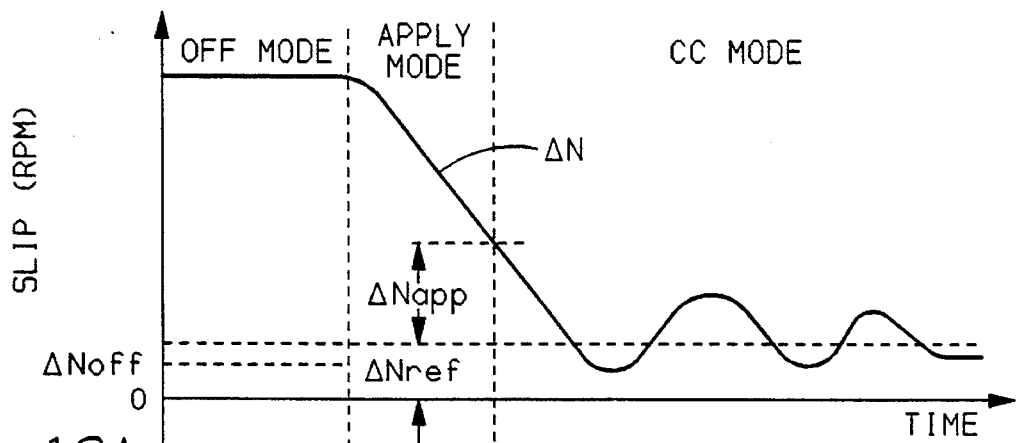
FIGS. 16A and 16B are time based graphs illustrating the operation of the control system with respect to clutch application and controlled capacity operation.
Figure 16B:
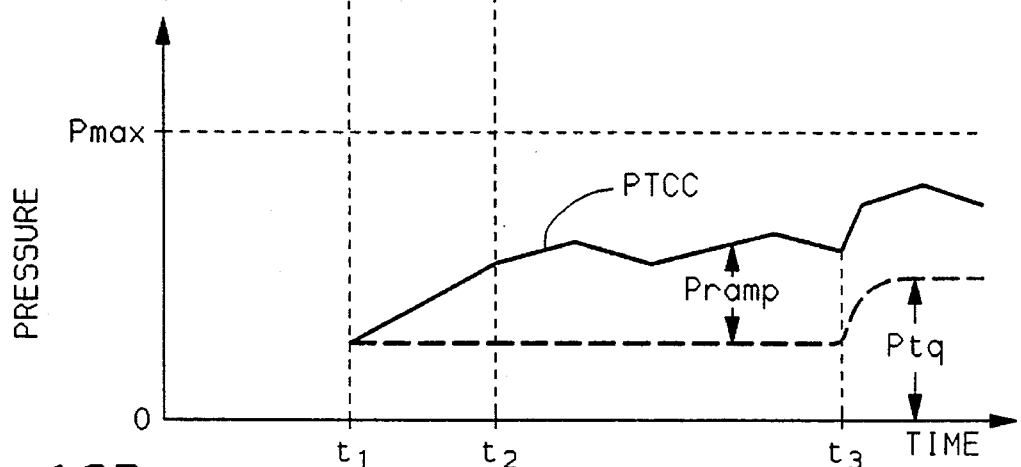

Referring to FIGS. 16A and 16B, the measured slip $\Delta N$ and net fluid pressure PTCC in the APPLY mode are graphically depicted therein against common time scales. The graph of FIG. 16A depicts measured clutch slip $\Delta N$ and FIG. 16B depicts net fluid pressure PTCC in the control chamber of the TCC. Beginning in the OFF mode, it can be seen that slip has attained a relatively steady value which is greater than the desired slip labelled $\Delta$Nref. It is also noted here that the measured slip in the OFF mode is greater than the OFF mode slip threshold $\Delta$Noff. Assuming that all other OFF mode exit criteria have been satisfied, application of the TCC can begin provided that APPLY mode entry criteria have been satisfied, including attainment of an appropriate vehicle speed for the current gear. This determination preferably is performed via a table look-up of apply line calibrations in a manner well known to those skilled in the art. Such apply line calibration for TCC application differ from conventional apply line calibrations in that in addition to the top gears, such as the third and fourth gears in a conventional four speed automatic transmission, lower gear(s) would be also represented by appropriate apply line calibration table(s) thus extending fuel economy benefits of TCC application to lower gears and vehicle speeds.

Beginning at time t1 as illustrated in FIGS. 16A and 16B, the APPLY mode is seen to continue until time t2 whereupon the CC mode is entered. At time t1, the net fluid pressure PTCC in the apply chamber of the TCC is seen to increase from zero pressure to an initial pressure equivalent to a pressure having a predetermined correlation to engine torque. The broken line (Ptq) represents the portion of PTCC established as a function of engine torque. At time t1 it is seen that the pressure value Ptq is equivalent to PTCC, and indeed comprises the entire fluid pressure in the control chamber. The portion of the net fluid pressure represented as a function of engine torque Ptq represents an APPLY mode baseline fluid pressure to which is added an accumulation of magnitudinally and algebraically equivalent fluid pressure adjustments throughout the APPLY mode. The APPLY mode is normally terminated when the measured slip $\Delta N$ is less than or equal to the APPLY mode slip threshold established as a summation of the reference slip $\Delta$Nref and the APPLY mode slip offset $\Delta$Napp.

During the APPLY mode, the release of throttle position beyond a certain amount which is likely to reduce positive engine torque significantly or cause torque to be negative would indicate the desirability of terminating the APPLY mode. Terminating continued TCC application during these minimal throttle positions will prevent unintended lock-up and associated driveline disturbances. For this purpose, a reduction in throttle position beyond a coast throttle threshold (% THcstL) will invoke the OFF mode immediately from the APPLY mode.

At time t2 the initial net fluid pressure value in the CC mode is equivalent to the terminal value of the net fluid pressure in the APPLY mode. The net fluid pressure PTCC continue to be comprised of a portion corresponding to a measure of engine torque Ptq and an accumulation of fluid pressure adjustments; however, the fluid pressure adjustments are of a lesser magnitude in the CC mode compared with the fluid pressure adjustments in the APPLY mode. Therefore, it can be seen that where engine torque is substantially constant, the net fluid pressure change in the APPLY mode occurs at a greater rate than the fluid pressure change in the CC mode. Additionally, the fluid pressure adjustments are bidirectional providing additions to and subtractions from net fluid pressure.

In examining the far right portions of FIG. 16B beginning at time t3, it can be seen that the portion of net fluid pressure in the apply chamber which is a function of engine torque undergoes a change in response to a corresponding change in engine torque. The correlation between the change in engine torque and a concomitant change in net fluid pressure maintains measured slip substantially at the reference slip while in the CC mode. Increases in engine torque therefore are accounted for in the net fluid pressure as established by the summation of a portion thereof correlating to the engine torque and a portion comprising the accumulation of fluid pressure adjustments in response to the sense of the measured slip versus the reference slip.

Figure 21A:
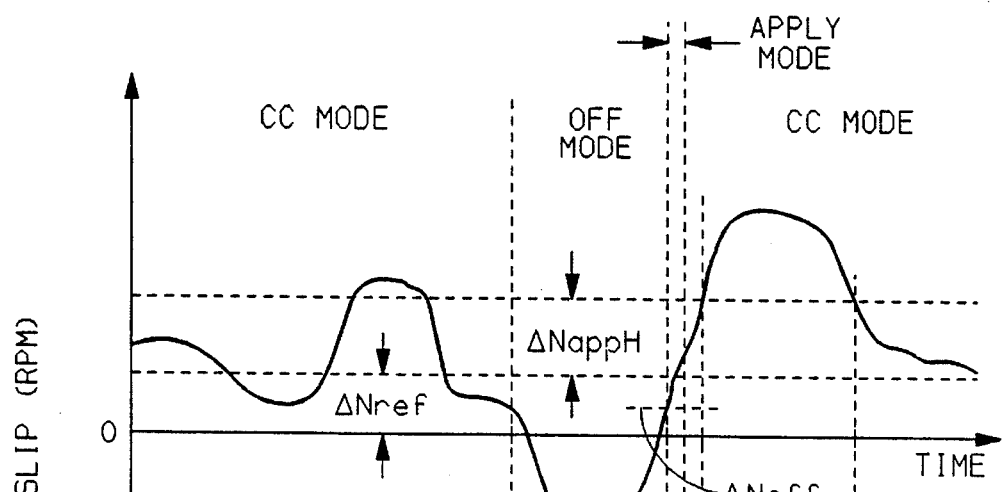
FIGS. 21A, 21B and 21C depict the operation of the control system with respect to certain transitions of the torque converter clutch from an off mode of operation into a controlled capacity mode of operation.
Figure 21B:
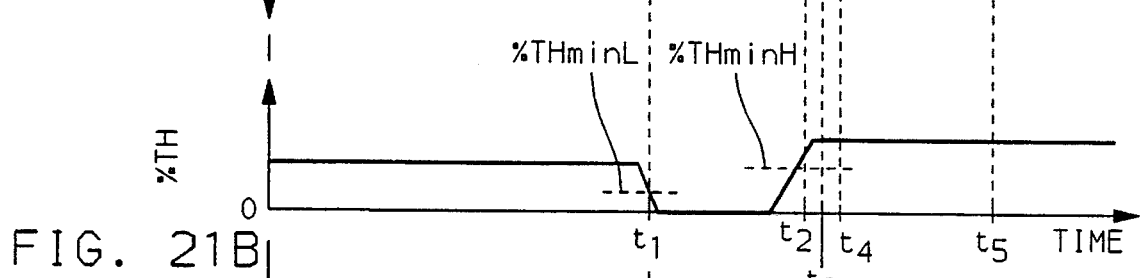
Figure 21C:
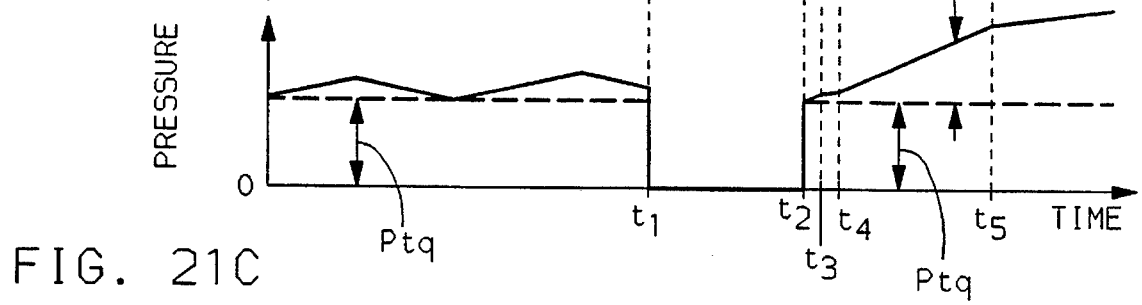

FIGS. 21A–21C depict a situation wherein a more aggressive application of the TCC may be desirable during CC mode. CC mode is seen terminated at time t1 by a minimum throttle condition where throttle position falls below a first minimum throttle threshold % THminL. Negative slip AN through the OFF mode is indicative of vehicle coast wherein wheel torque is transmitted through the vehicle drivetrain to the output member of the torque converter. Through the OFF mode, relatively little resistance to engine acceleration is presented by the strictly fluid coupling between the input and output members of the torque converter. Upon increasing the throttle position, slip $\Delta N$ can be seen to increase relatively rapidly due in part to the insubstantial resistance to engine acceleration. A second minimum throttle threshold % THminH (which is shown occurring prior to time t2) is ultimately exceeded thereby enabling OFF mode termination if APPLY mode criteria are satisfied.

Proceeding with the assumption that vehicle speed is in excess of the appropriate apply line, time t2 marks the initiation of the APPLY mode due to slip ΔN exceeding the OFF mode slip threshold ΔNoff. At time t3 which marks a single control loop from t2, CC mode is invoked because measured slip ΔN is less than or equal to the APPLY mode slip threshold (ΔNref+ΔNapp). This of course reduces the rate at which fluid pressure adjustments are made since, as previously described, a less aggressive adjustment is associated with the CC mode than with the APPLY mode. However, acceleration of the engine continues and, without a more aggressive adjustment to fluid pressure, the slip ΔN may become excessive and require a lengthy reduction time toward the reference slip. Therefore, it is desirable to control such potentially excessive slip and the present embodiment does so by substituting the pressure adjustments normally associated with the APPLY mode in the CC mode. The substitution is invoked by slip ΔN being in excess of the APPLY mode threshold (ΔNref+ΔNapp) as shown at time t4 within a predetermined time after CC mode is entered. The accumulation of APPLY mode fluid pressure adjustments continues through the CC mode until slip falls below the threshold as illustrated at time t5, whereafter the CC mode fluid pressure adjustments are accumulated.

Figure 17A:
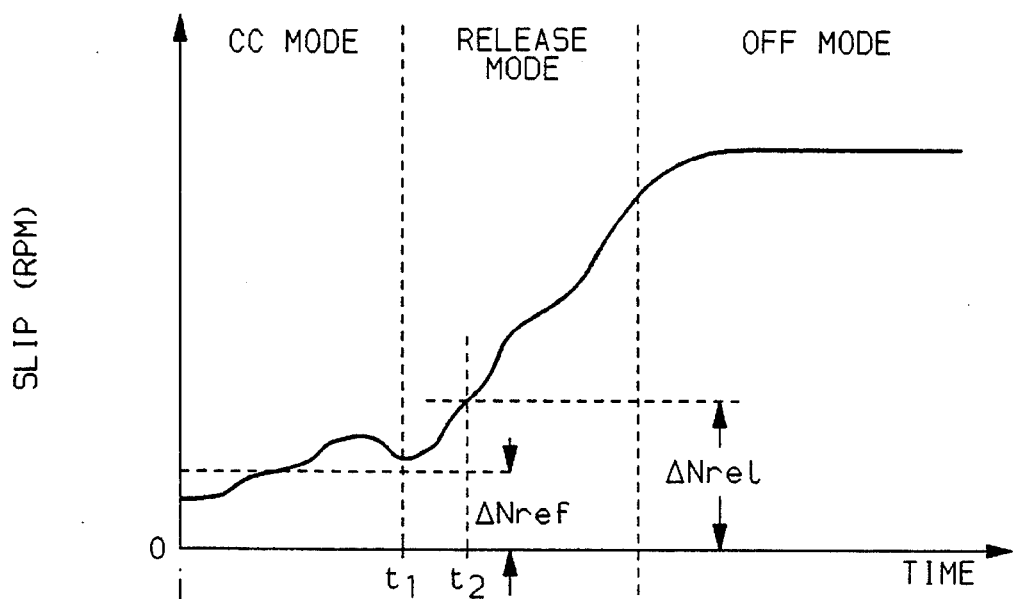
FIGS. 17A and 17B are time based graphs illustrating the operation of the control system with respect to a transition from controlled capacity operation to total clutch disengagement.
Figure 17B:
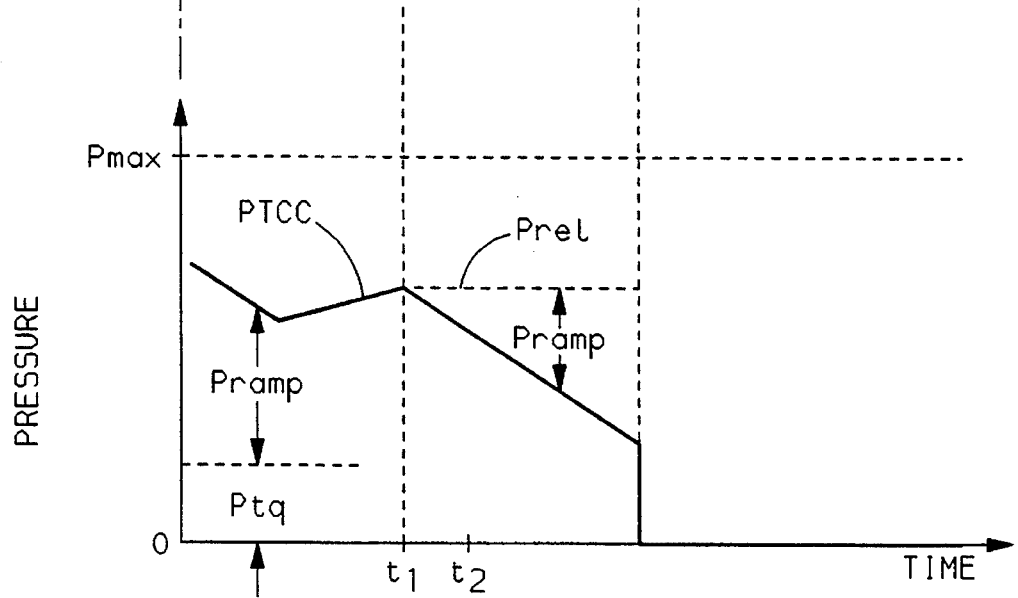

Referring now to FIGS. 17A and 17B, transition out of the CC mode and into the OFF mode via a controlled release is illustrated. The measured slip ΔN and net fluid pressure PTCC are graphically depicted therein against common time scales. Assuming steady state operation in the CC mode, a controlled release is initiated when RELEASE mode entry criteria have been satisfied. Such criteria preferably includes reduction to an appropriate vehicle speed for the current gear as determined in a conventional fashion via a table look-up of release line calibrations. Of course, lower gear release line calibration tables are necessarily utilized where the control of the present invention operates in conjunction with lower gears. Positive change in throttle position is yet another criteria which is used to initiate a controlled release by the RELEASE mode. The time rate of change in throttle position may provide indicia of the operator's desire for more aggressive acceleration than would be available within the CC mode and therefore the control of the present embodiment effectuates a controlled release to advantageously respond to such demand by providing the operator with the torque multiplication benefits of additional fluidic coupling via the hydrodynamics of the torque converter.

Upon initiation of the RELEASE mode at time t1, a RELEASE mode baseline fluid pressure (Prel) equivalent to the terminal value of CC mode net fluid pressure PTCC is established. Throughout the RELEASE mode the baseline fluid pressure Prel remains fixed and an accumulation of fluid pressure adjustments Pramp is summed therewith to establish the net fluid pressure PTCC. All fluid pressure adjustments are equivalent in both magnitude and algebraic sign, thereby effectuating a substantially linear reduction in the net fluid pressure PTCC. The rate of reduction is preferably at a rate greater than the CC mode rate since a quicker response is generally sought in the RELEASE mode. Additionally, a first rate of PTCC reduction is utilized if the release is invoked by release line criteria and a second, more aggressive rate of PTCC reduction is utilized if the release is invoked by throttle rate of change. It is noted that the net fluid pressure PTCC is not influenced in the RELEASE mode by any portion thereof being correlated to a measure of engine torque. The RELEASE mode will normally continue with reductions to the net pressure PTCC at the appropriate rate until the expiration of a predetermined amount of time or net fluid pressure PTCC equals zero, whichever occurs first.

In addition to normal transition to OFF mode, a fail-safe selection of the OFF mode is preferably included to detect appropriate release progression. In the present embodiment, where slip ΔN does not exceed a RELEASE mode threshold ΔNrel within a predetermined amount of time or control loops, then OFF mode is immediately selected.

Figure 18A:
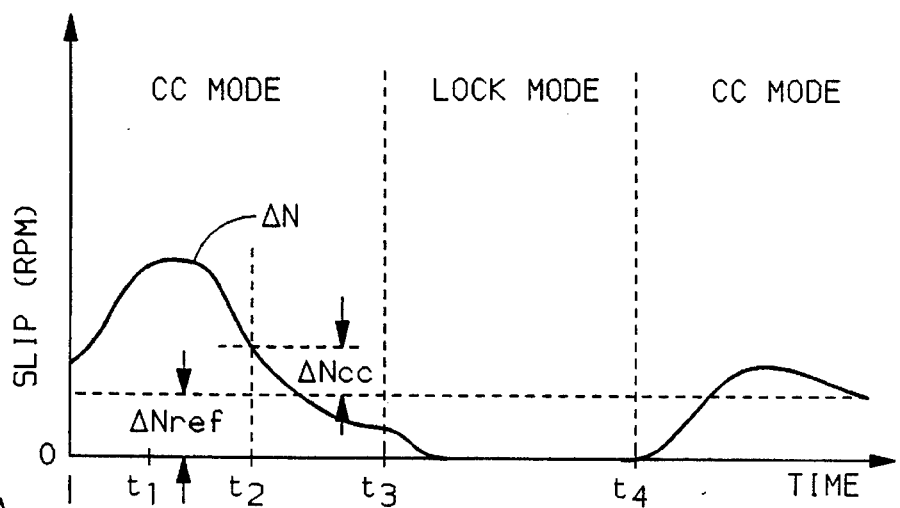
FIGS. 18A, 18B and 18C are time based graphs depicting the operation of the control system with respect to torque converter clutch transitions between a controlled capacity mode and a LOCK mode.
Figure 18B:
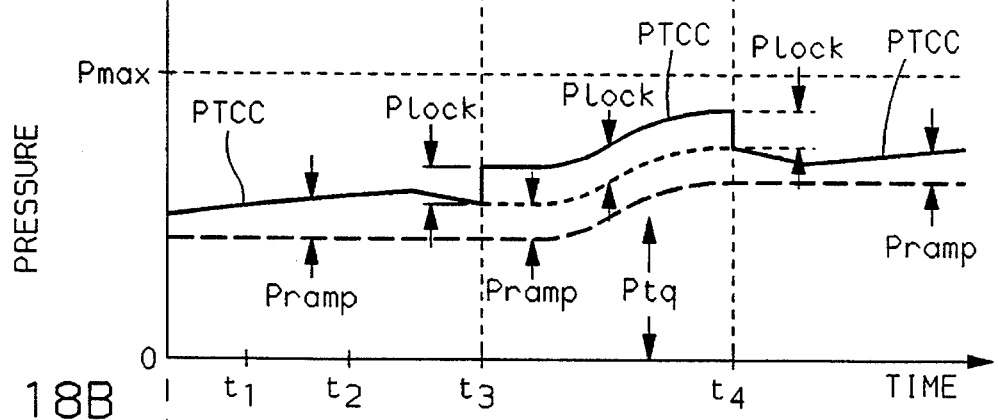
Figure 18C:
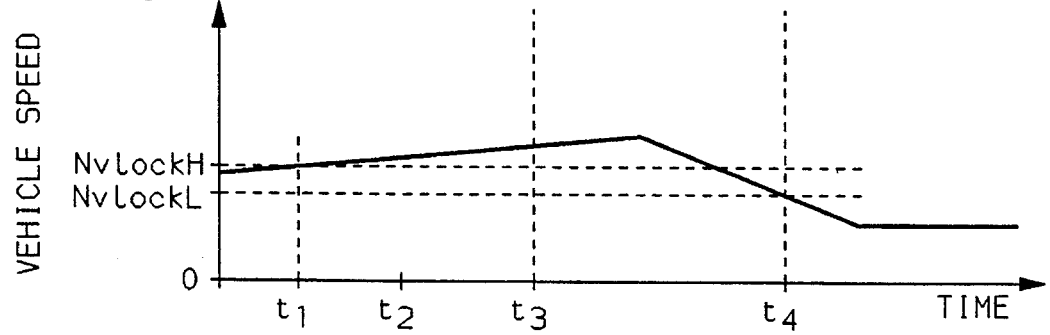

FIGS. 18A–18C illustrate TCC slip, control chamber fluid pressure and vehicle speed, respectively, along common time axes through transition into and out of the LOCK mode of operation. As previously mentioned with respect to FIG. 23, the LOCK mode is only accessible from the CC mode. The transmission is assumed to be in the highest available gear which is conventionally appropriate for TCC lock-up. Generally, vehicle speed in excess of a first LOCK mode speed threshold (NvlockH) will cause application of a TCC in a conventional control system. In the present control, however, NvlockH is exceeded at time t1 without TCC lock-up immediately ensuing. The LOCK mode is not invoked until slip ΔN, for a predetermined amount of time (t2–t3), remains less than or equal to the LOCK mode initiation slip threshold established as a summation of the reference slip ΔNref and a CC mode slip offset ΔNcc.

At the termination of the CC mode, accumulation of further fluid pressure adjustments ceases and the terminal value thereof is frozen. The net fluid pressure PTCC at the termination of the CC mode is summed with a predetermined LOCK mode fluid pressure step (Plock) to establish the initial net fluid pressure in the LOCK mode. Throughout the LOCK mode the net fluid pressure is comprised of the summation of a baseline fluid pressure having a predetermined correlation to engine torque Ptq, the frozen accumulation of fluid pressure adjustments Pramp and the LOCK mode pressure offset Plock.

The LOCK mode terminates normally and transitions to the CC mode when vehicle speed crosses a second LOCK mode speed threshold (NvlockL) such as is illustrated at time t4. An initial net fluid pressure in the CC mode is then established as the terminal net fluid pressure in the LOCK mode reduced by the LOCK mode fluid pressure step. CC mode net fluid pressure adjustments then continue as previously described.

Generally, the amount of fluid pressure added by the LOCK mode fluid pressure step is calibrated to be marginally sufficient to overcome the rotational forces of the input member and maintain the TCC in a lock-up state. All else being equal, a greater rotational force than that present at the time of lock-up will be required to cause TCC slip due to the larger coefficient of friction associated with static bodies. This provides a inherent amount of hysteresis which prevents undesirable TCC slip in the case of marginal torque perturbations. However, it also provides the TCC with the inherent ability to bypass more substantial positive torque perturbations and adaptively adjust net fluid pressures in the event of a LOCK mode slip.

Figure 19A:
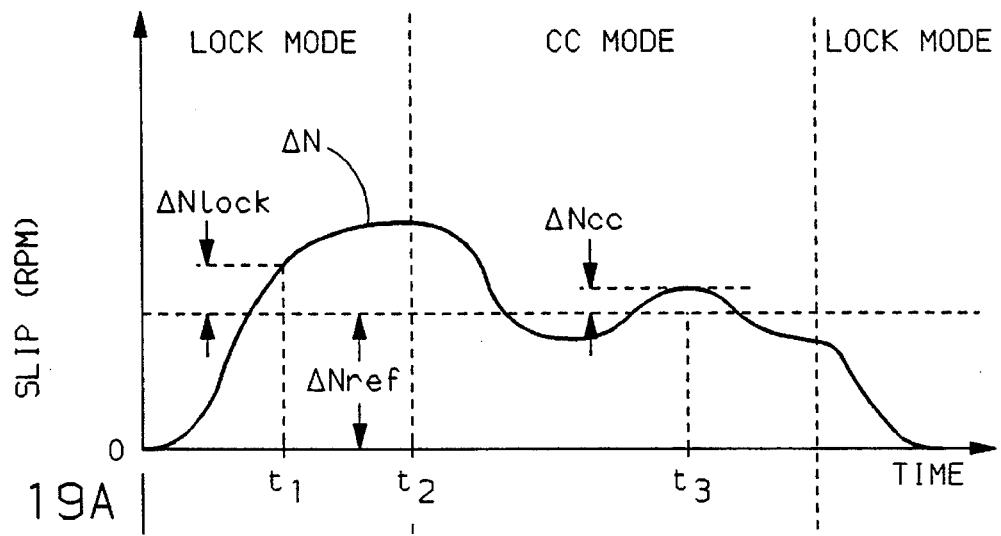
FIGS. 19A and 19B depict the operation of the control system with respect to the torque converter clutch transitions into and out of LOCK mode and controlled capacity mode of operation.
Figure 19B:
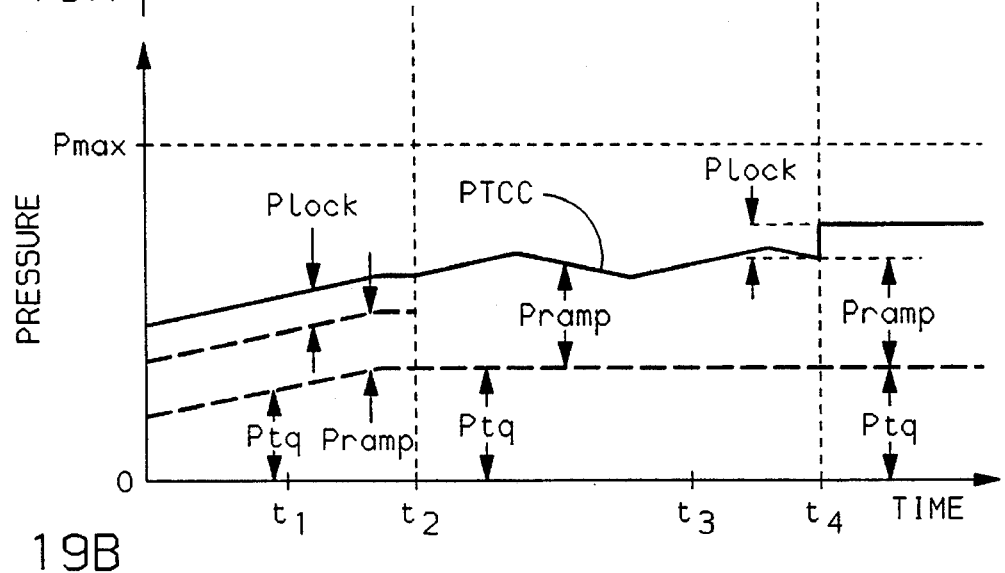

An examination of FIGS. 19A and 19B demonstrate such benefits and features of the present invention. If the LOCK mode is operational and measured slip ΔN, for a predetermined amount of time (t1–t2), remains greater than the LOCK mode termination slip threshold established as the summation of the reference slip ΔNref and a LOCK mode slip offset ΔNlock, then CC mode is immediately invoked. However, in contrast to a normal transition to CC mode, where TCC slip invokes the transition out of LOCK mode (a slip transition), the initial net fluid pressure in the CC mode is then established as the terminal net fluid pressure in the LOCK mode without being reduced by the LOCK mode fluid pressure step. CC mode net fluid pressure adjustments then continue as previously described with the initial value of accumulation of fluid pressure adjustments Pramp equal to the frozen accumulation of fluid pressure adjustments Pramp and the LOCK mode fluid pressure step Plock. This additional LOCK mode fluid pressure step being integrated into the net fluid pressure PTCC adaptively provides for torque capacity beneficial for minimizing further slip deviations.

In order that reapplication of the TCC does not occur too soon after a slip transition, the LOCK mode is preferably forestalled for a predetermined period of time [t2–t3] after which LOCK mode may be invoked if all other conditions are met. In the FIG. 19A, although slip ΔN remains below the threshold (ΔNref+ΔNcc) for an otherwise adequate time, the control of the present invention ignores such event until time t3 due to the previous slip transition and corresponding delay (t2–t3). In this FIG. 19A, the slip ΔN remains below the LOCK mode initiation slip threshold for the requisite time (t3–t4) and LOCK mode is once again invoked. The initial net pressure in LOCK mode is again established by adding to the terminal net fluid pressure in CC mode a predetermined LOCK mode fluid pressure step Plock.

Figure 20A:
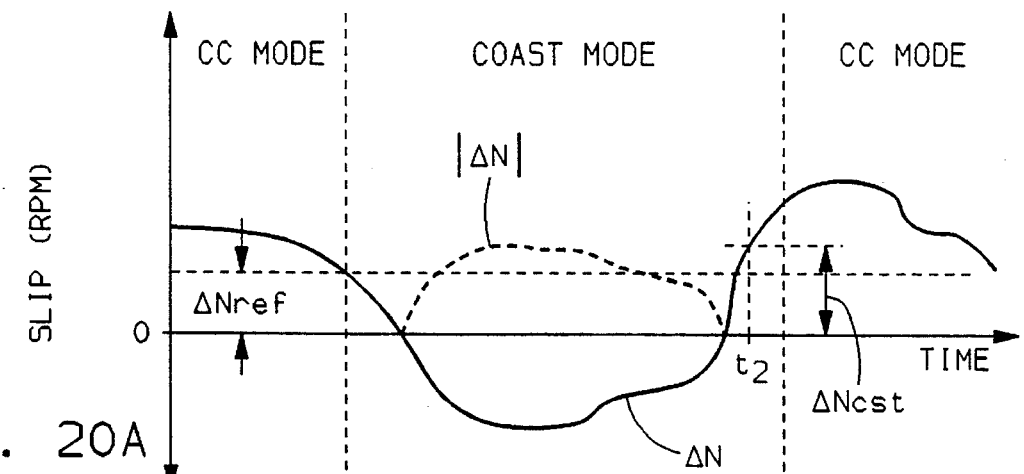
FIGS. 20A, 20B and 20C depict the operation of the control system with respect to transitions into and out of a COAST mode and control operation within the COAST mode.
Figure 20B:
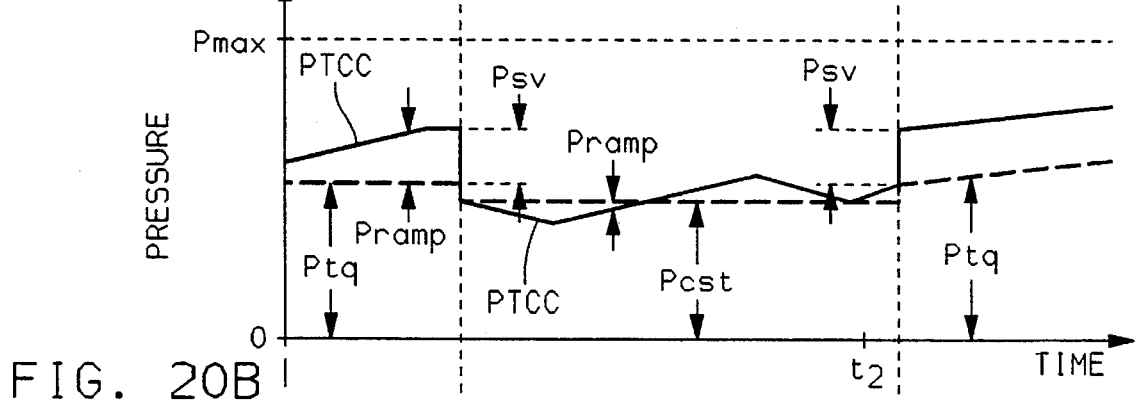
Figure 20C:
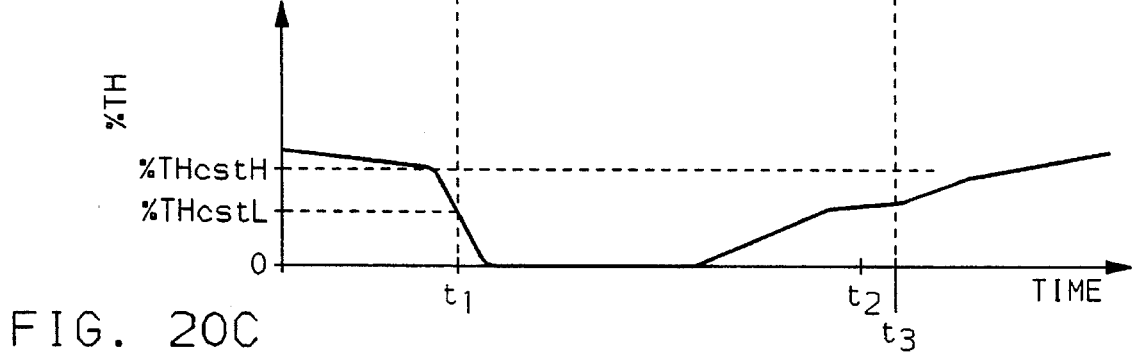

Another mode of operation accessible from the CC mode and LOCK mode is COAST mode. FIGS. 20A–20C illustrate slip, control chamber fluid pressure and throttle position, respectively, versus common time axes for transition into and out of COAST mode and CC mode. COAST mode is invoked in accordance with identical criteria from either CC mode or LOCK mode. Transition from the CC mode to the COAST mode is illustrated in FIGS. 20A–20C where throttle position crosses a first coast throttle threshold % THcstL. Release of throttle position beyond this calibration threshold is likely to reduce positive engine torque significantly and result in the vehicle drivetrain driving the engine. At the initiation of the COAST mode at t1, the terminal value of the accumulation of fluid pressure adjustments Pramp is saved as Psv and thereafter reset to zero. Also, the initial net fluid pressure PTCC is established as a COAST mode baseline fluid pressure Pcst which is a function of torque converter output member speed. Thereafter throughout COAST mode, the net fluid pressure PTCC is established as the summation of Pcst and the accumulation of fluid pressure adjustments Pramp. These adjustments are made in a similar fashion to those made in the CC mode; however, it is the absolute value of slip |ΔN| that is compared to the reference slip lNref to establish the direction of adjustment. The object of slip control in the COAST mode is to maintain torque capacity of the TCC sufficient to drive the engine with available wheel torque while providing damping for driveline disturbances such as those experienced upon resumption of throttle position and associated torque reversal.

COAST mode normally transitions to CC mode upon throttle position exceeding a second coast threshold (% THcstH). This second threshold is greater than the first threshold and together therewith provides for a degree of hysteresis. FIG. 20C shows gradual resumption of throttle position above the first coast throttle threshold % THcstL at a time prior to t3 without causing transition to the CC mode. Another transition to CC mode occurs if slip ΔN exceeds a COAST mode slip threshold ΔNcst for a predetermined time. This transition is illustrated in FIGS. 20A–20C where slip ΔN exceeds the threshold ΔN for the requisite time (t2–t3).

Upon transition to CC mode, the net fluid pressure is once again determined as the summation of a portion corresponding to positive engine torque Ptq and a portion comprising the accumulation of fluid pressure adjustments Pramp. The initial net fluid pressure is established by summing Ptq with the value of Pramp saved as Psv at the inception of the COAST mode. Further adjustments to Pramp are then made relative its initial CC mode value.

FIGS. 22A–22D illustrate a throttle change induced addition to net fluid pressure advantageously providing a slip margin to prevent unintended full application of the TCC or to provide additional torque coupling through the hydrodynamics of the torque converter. In essence, rapid application or release of the throttle results in the addition or subtraction of a correlating signed pressure step Pdth from the net fluid pressure PTCC.

FIG. 22D shows a trace representing PTCC through a CC mode. At time t1 a sufficient negative rate of throttle position change occurs and the system responds by adding a negative pressure step Pdth from PTCC. Similarly at times t2 and t3, sufficient positive rate of throttle position changes occur and the system responds by subtracting from PTCC a positive pressure step Pdth. Preferably, the magnitude of Pdth is determined substantially in proportion to the magnitude of the throttle position change.

Figure 2:
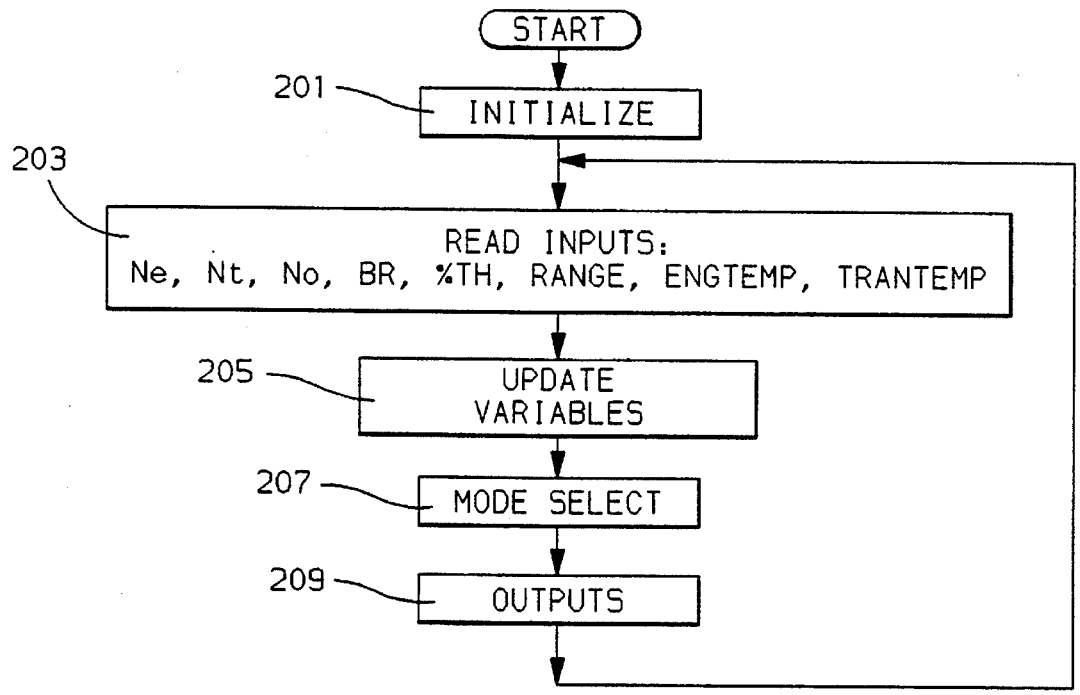
FIGS. 2–15 are flow diagrams representative of program instructions executed by the control unit shown in FIG. 1 in carrying out the control functions of the present invention.

The control function of the system as described above are carried out by the transmission control unit 180 when it executes program instructions represented by the flow diagrams shown in FIGS. 2–15. The instruction set is executed at regular intervals and may be part of a larger set of instructions for performing other vehicle control functions. Referring first to FIG. 2, step 201 is executed such as at the initiation of vehicle operation to initialize various counters, flags, timers and variables, and read in various calibration constants from ROM into RAM in preparation for performing the functions of the various vehicle controls, including those of the present invention. The table below sets forth various calibration constants as used in the present control:

| CALIBRATION CONSTANTS | |
|---|---|
| CALIBRATION CONSTANT | DESCRIPTION |
| ΔNrel | RELEASE mode slip threshold |
| ΔNoff | OFF mode slip threshold |
| ΔNcc | CC mode slip offset |
| ΔNcst | COAST mode slip threshold |
| ΔNapp | APPLY mode slip offset |
| % THcstL | coast throttle threshold low |
| % THcstH | coast throttle threshold high |
| % THmin | minimum throttle threshold |
| ETmin | minimum engine temperature |
| TRTmin | minimum transmission temperature |
| Δ % TH(−) | negative throttle change threshold |
| Δ % TH(+) | positive throttle change threshold |
| ΔN(−) | negative slip threshold |
| NvcstL | COAST mode vehicle speed threshold |
| NvlockH | LOCK mode vehicle speed threshold high |
| NvlockL | LOCK mode vehicle speed threshold low |
| RELRATEdth | RELEASE mode delta throttle fluid pressure adjustment rate |
| RELRATEdef | RELEASE mode default fluid pressure adjustment rate |
| CCRATEdef | CC mode default fluid pressure adjustment rate |
| T | fluid pressure adjustment period |
| Plock | LOCK mode fluid pressure step |

From step 201, steps 203–209, which represent various program steps germane to the present inventive control, are repetitively executed. Step 203 represents steps to read, filter, convert analog to digital and otherwise condition various inputs from transducers and sensors as utilized in the present control functions. The table below sets forth various inputs as used in the present control.

INPUT TABLE

| INPUT | DESCRIPTION |
| --- | --- |
| RANGE | operator selected gear range (PRND32L) |
| BR | brake signal |
| Ne | engine speed |
| Nt | turbine speed |
| No | transmission output speed |
| % TH | throttle position |

Step 205, next encountered, represents program steps for repetitively updating variables from the various inputs, calibration constants, calculations, and calibration table look-ups performed thereby. Included in such updates are the following variables and corresponding descriptions.

VARIABLE TABLE

| VARIABLE | DESCRIPTION |
| --- | --- |
| $\Delta N$ | measured slip (Ne–Nt) |
| $\Delta$ % TH | throttle position change |
| Nvrel | TCC release line |
| Nvapp | TCC apply line |
| APPRATE | rate of fluid pressure adjustments in APPLY mode |
| CCRATE | rate of fluid pressure adjustments in CC mode |
| CSTRATE | rate of fluid pressure adjustments in COAST mode |
| $\Delta$Nref | reference slip |
| Pdth | delta throttle pressure |
| Ptq | APPLY, CC & LOCK mode baseline fluid pressure |
| Pcst | COAST mode baseline fluid pressure |
| Pramp | accumulated fluid pressure adjustments |

Figure 3:
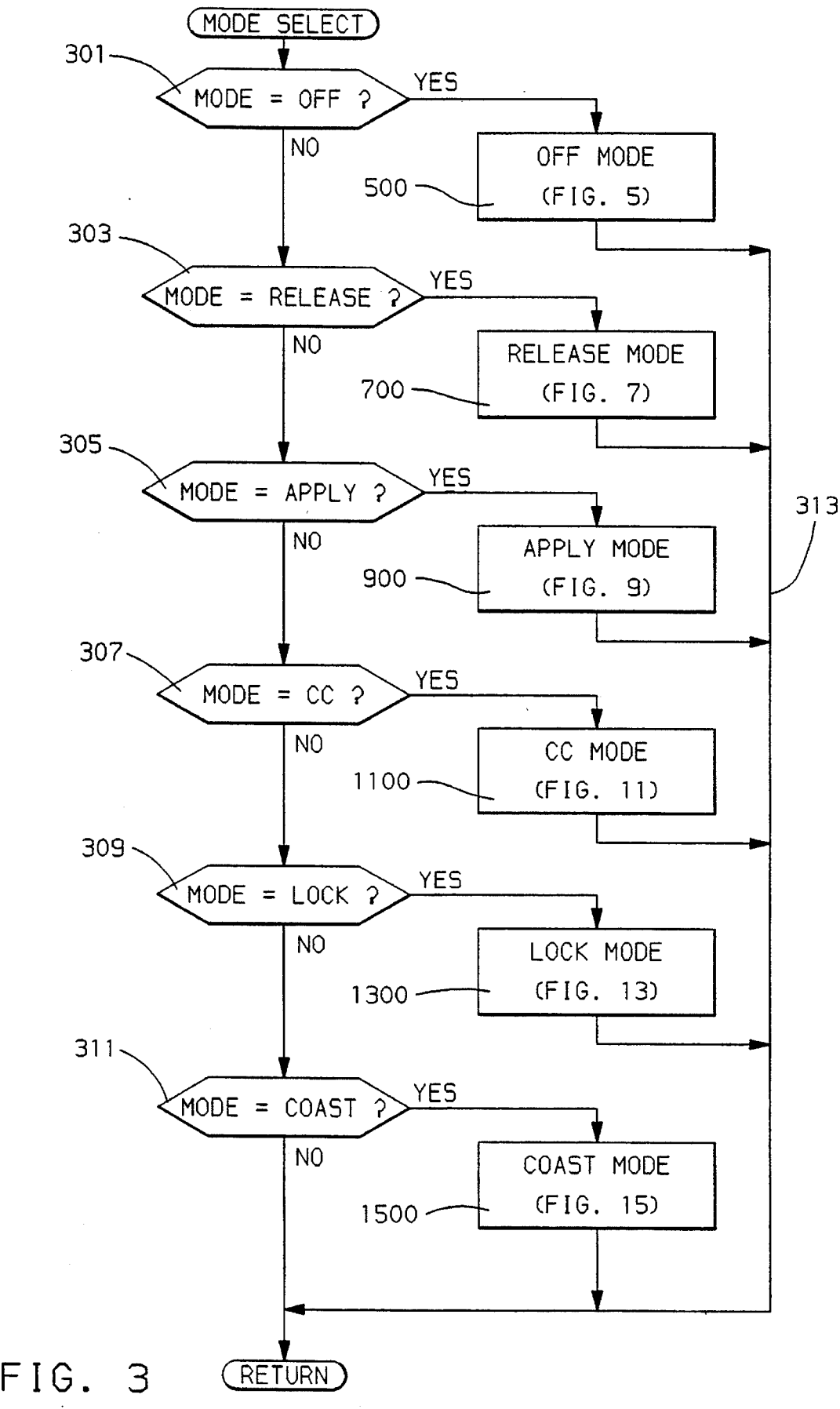

Step 207 represents operating mode selection and control calculations consistent therewith in accordance with the priority approach as illustrated in FIG. 3. Step 209 represents controller interface with the transmission components controlled thereby including solenoid valve 72 via line 182 as illustrated in FIG. 1.

FIG. 3 shows the priority selection logic for the various modes in the present control in accordance with appropriate bit settings of one or more mode register(s) dedicated to that function and updated periodically as described herein. The first affirmative response to any step 301–311 routes control to the corresponding mode steps, the step 301–311 being illustrated with the preferred relative levels of prioritization from top to bottom sequentially. In step 301, a determination is made with respect to the highest priority mode, the OFF mode. A positive response to the query results in the execution of the OFF mode program steps represented by step 500 and the flow chart in FIG. 5, and thereafter bypassing further mode selection queries in the current control loop via line 313. A negative response at step 301 passes control to program steps represented by step 303 whereat a determination is made with respect to the next highest priority mode, the RELEASE mode. If the RELEASE mode is indicated by appropriate bit settings in the mode register(s), RELEASE mode program steps are executed as represented by step 700 and the flow chart of FIG. 7. The remaining mode select queries are thereafter bypassed via line 313. A negative response at step 303 of course results in a query at step 305 with respect to the next highest priority mode, APPLY mode. Similar to the immediately preceding description of priority routing to appropriate control mode program steps, the APPLY, CC, LOCK and COAST mode program steps are appropriately selected and executed at step pairs 305 & 900, 307 & 1100, 309 & 1300, and 311 & 1500, respectively.

Figure 5:
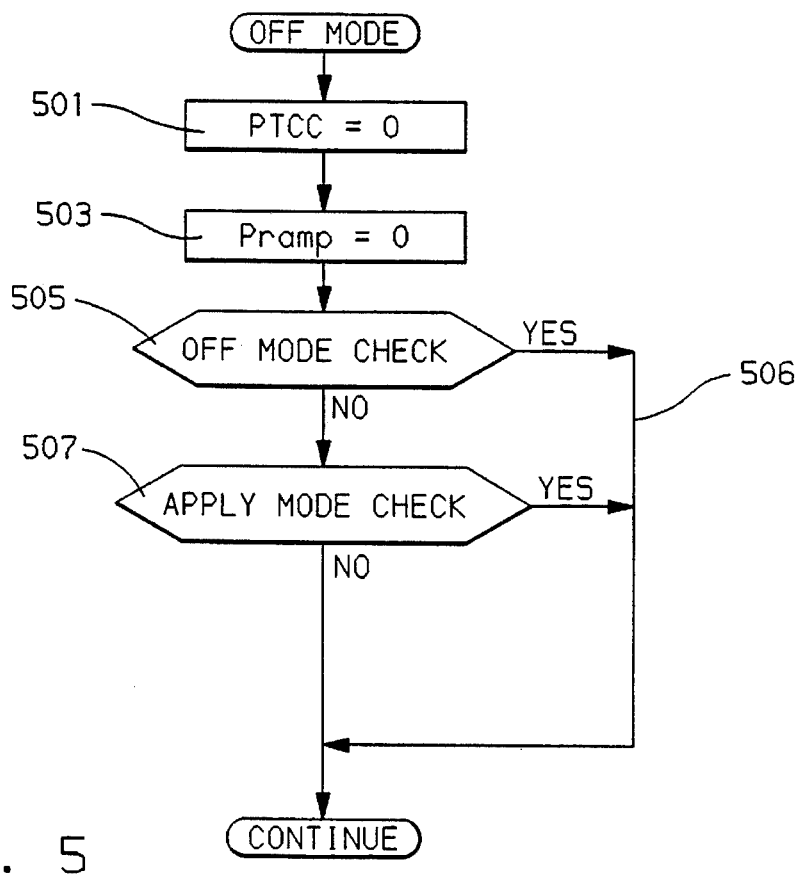

Turning to FIG. 5, a flow chart representing program steps executable in the OFF mode are illustrated. It is the first mode discussed herein in as much as it is the default mode first executed. Here, step 501 sets PTCC to zero, PTCC representing net fluid pressure control signal and relative net fluid pressure corresponding thereto. In the present embodiment, a zero control signal setting represents a zero duty cycle PWM signal and corresponds to the minimum net fluid pressure and a 100% duty cycle corresponds to the maximum net fluid pressure. The correlation between the PWM duty cycle and net fluid pressure is therefore positive. Negative correlations are equally applicable whereby a 100% duty cycle PWM control signal would correspond to the minimum net fluid pressure and a zero percent duty cycle to the maximum net fluid pressure. For simplicity in description and correspondence between the flow charts and graphic illustrations contained herein, further description will be with respect to positively correlated PWM control signals and net fluid pressures.

Figure 8:
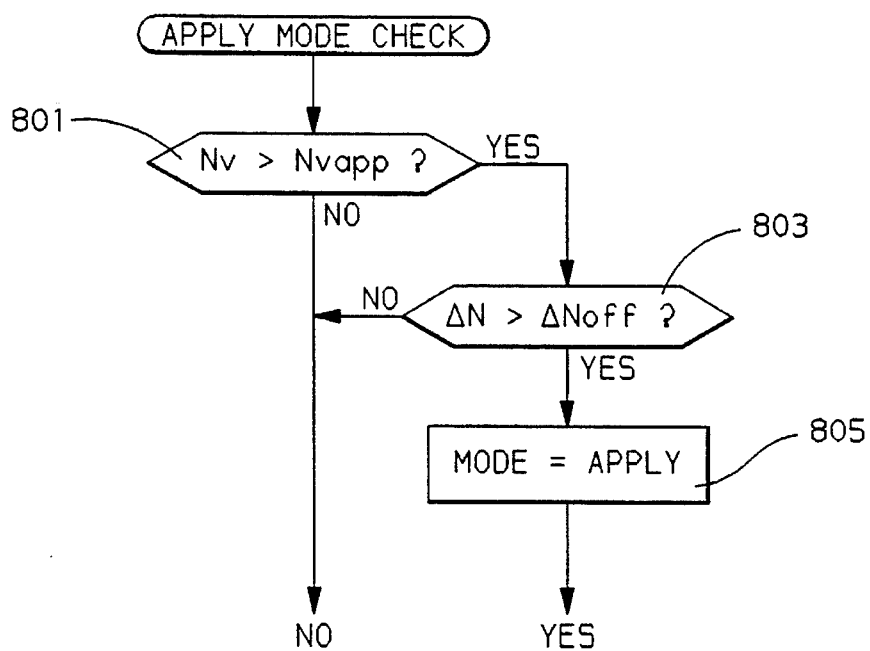

Step 503 initializes the accumulation of fluid pressure adjustment Pramp to zero, thus ensuring that when the OFF mode is exited to the APPLY mode an initial value for fluid pressure adjustments will always be zero. Steps 505 and 507 represent program steps for evaluating various criteria to determine the propriety of transitioning out of the OFF mode into the APPLY mode. Step 505 represents program steps detailed in FIG. 4 executed to determine whether various OFF mode criteria continue to indicate the desirability of remaining in the OFF mode. Where any of the OFF mode criteria indicates the continuance of the OFF mode, determinations of the desirability of the lower priority APPLY mode is superfluous and therefore will be bypassed via line 506. Where none of the OFF mode criteria indicates the continuance of the OFF mode, step 507 is encountered to determine whether the APPLY mode is to be initiated. A flow chart representing program steps executed to determine if various APPLY mode criteria indicate the desirability of initiating the APPLY mode is illustrated in FIG. 8. Where such a transition to the APPLY mode is not warranted based on the criteria, the mode continues to be specified as OFF mode. The program steps represented by steps 505 and 507 first to specify affirmative selection of a respective mode will determine the mode to be invoked in the next control loop.

Figure 4:
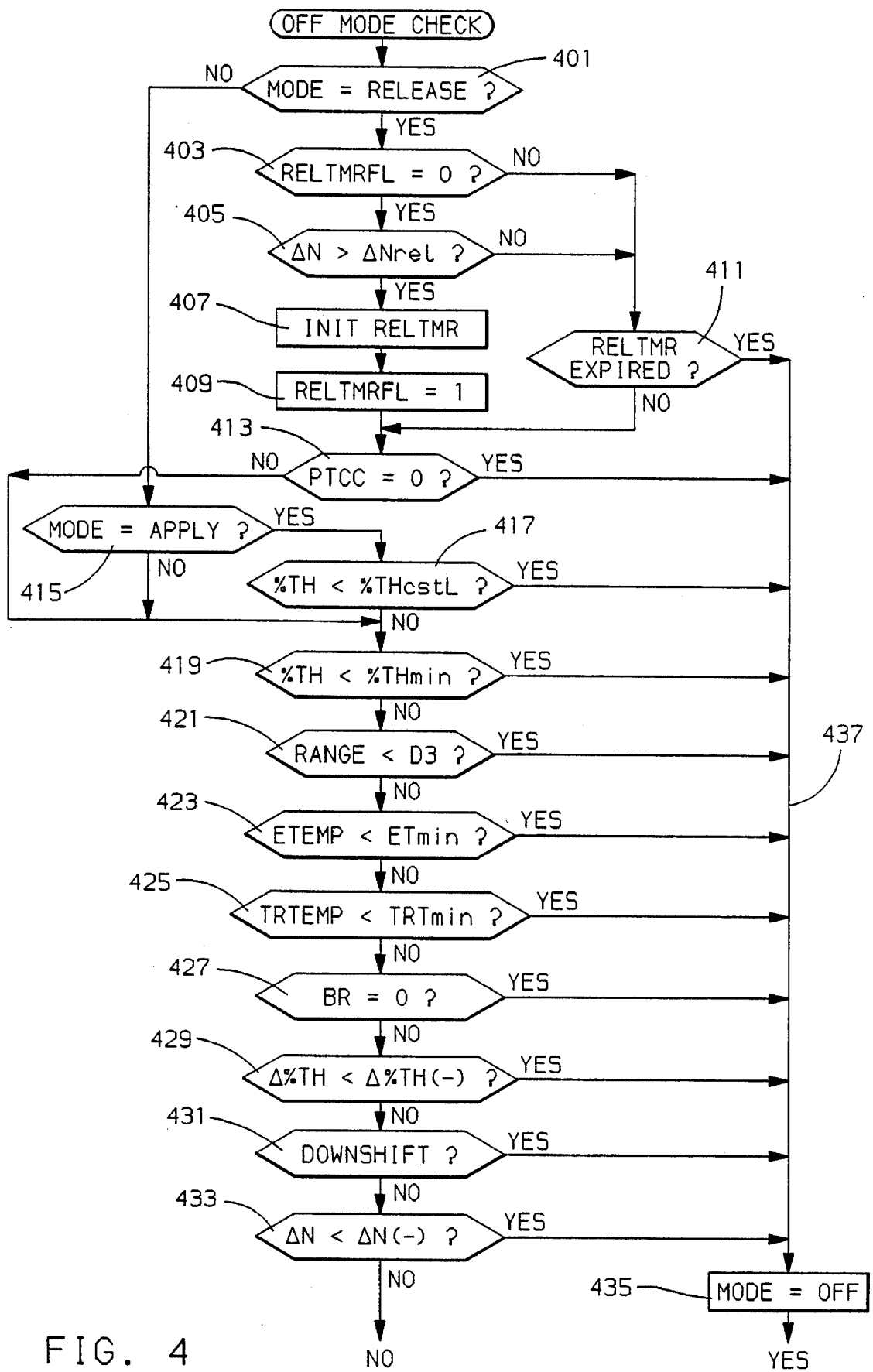

The OFF mode check is performed in accordance with the steps shown in FIG. 4. Step 401 determines whether the current mode from which this OFF mode check is occurring is the RELEASE mode. If RELEASE mode is currently active then steps 403–413, which represent criteria checks uniquely related to the RELEASE mode to OFF mode transition, determine if (a) slip $\Delta N$ has exceeded the RELEASE mode slip threshold $\Delta$Nrel within a predetermined maximum release delay time, (b) RELEASE mode has been operative for the maximum allowable time, or (c) net fluid pressure is minimum. Any of these criteria being met will bypass the remaining OFF mode criteria checks via line 437 and set appropriate bits in the mode register(s) at step 435. Thereafter, control returns to the appropriate portion of the program via the branch labeled "YES".

Timer flag "RELTMRFL" at step 403 is checked to determine if slip $\Delta N$ has exceeded the RELEASE mode threshold ΔNrel within a predetermined maximum "release delay" time. RELTMRFL equal to zero indicates that the slip ΔN in the previous loop did not exceeded the threshold and another check of slip in the present loop is required to be performed at step 405. Slip ΔN is checked once again against the threshold slip ΔNREL and if it does not exceed the threshold step 411 checks to see if the timer "RELTMR" has expired. RELTMR, for purposes of this check, was initialized at a maximum release delay time at the onset of the RELEASE mode. If RELTMR expires before slip ΔN crosses the thresholdNrel, the OFF mode is immediately selected.

Where the result of the query in step 405 is affirmative, indicating slip ΔN has exceeded the threshold ΔNrel within the time allotted, it is assumed that RELEASE mode progression is normal and RELTMR is initialized to a maximum allowable time for continuing the RELEASE mode at step 407. Step 409 then sets the RELTMRFL to "1" so that future passes through the OFF mode check during the RELEASE mode will skip steps 405–409 and proceed directly step 411 whereat RELTMR is checked for expiration, such expiration being indicative of the maximum allowable time for RELEASE mode operation having been exceeded. Therefore, an expired RELTMR from this point forward results in OFF mode selection. An unexpired RELTMR, whether quantifying maximum release delay or maximum time in RELEASE mode, routes further processing to step 413 whereat net fluid pressure is checked. If net fluid pressure is determined to be at a minimum, RELEASE mode is completed and OFF mode is selected via line 437 and step 435. Where none of the criteria of steps 403–413 result in selection of the OFF mode, further checks of OFF mode criteria not uniquely related to the transition from RELEASE mode to OFF mode are performed (steps 419–433).

If step 401 determines that the RELEASE mode is not the current mode from which the present OFF mode checks are being performed, step 415 is executed to make a similar determination with respect to the APPLY mode. An affirmative response to step 415 routes control to a step 417 wherein the throttle position %TH is checked against a coast throttle threshold % Thcstl. A throttle setting less than the threshold causes immediate selection of the OFF mode form the APPLY mode since continued application of the TCC where a coast condition is indicated is not desirable. A negative response at step 415 or a throttle position above the coast throttle threshold while in APPLY mode results in continued checks of OFF mode criteria not uniquely related to the transition from APPLY mode to OFF mode via steps 419–433.

Steps 419–433 represent generic OFF mode criteria, any one of which if affirmative causes immediate selection of the OFF mode. Step 419 is a minimum throttle setting check whereat current throttle position % TH is checked against a threshold represented by % Thmin. The minimum throttle setting check is caused to occur with a degree of hysteresis based on a pair of throttle thresholds comprising % Thmin. Step 421 is a check of operator selected gear range "RANGE". In the present embodiment as implemented in a four speed automatic transmission, selection of a range of gears limited to first and second will ensure operation in the OFF mode. Engine temperature and transmission temperature minimums are checked at steps 423 and 425 respectively to ensure closed loop engine control and appropriate transmission operating fluid temperatures for accurately and repeatably performing the control functions of the present invention. Service brake application is checked at step 427, which application will cause immediate selection of the OFF mode. The throttle position change Δ% TH is checked against a threshold Δ% TH(−) to determine if the operator has released the throttle abruptly enough to warrant OFF mode selection. Step 431 selects the OFF mode when a down shift is in progress and step 433 selects the OFF mode if slip ΔN is negative and less than a negative slip threshold ΔN(−).

Figure 6:
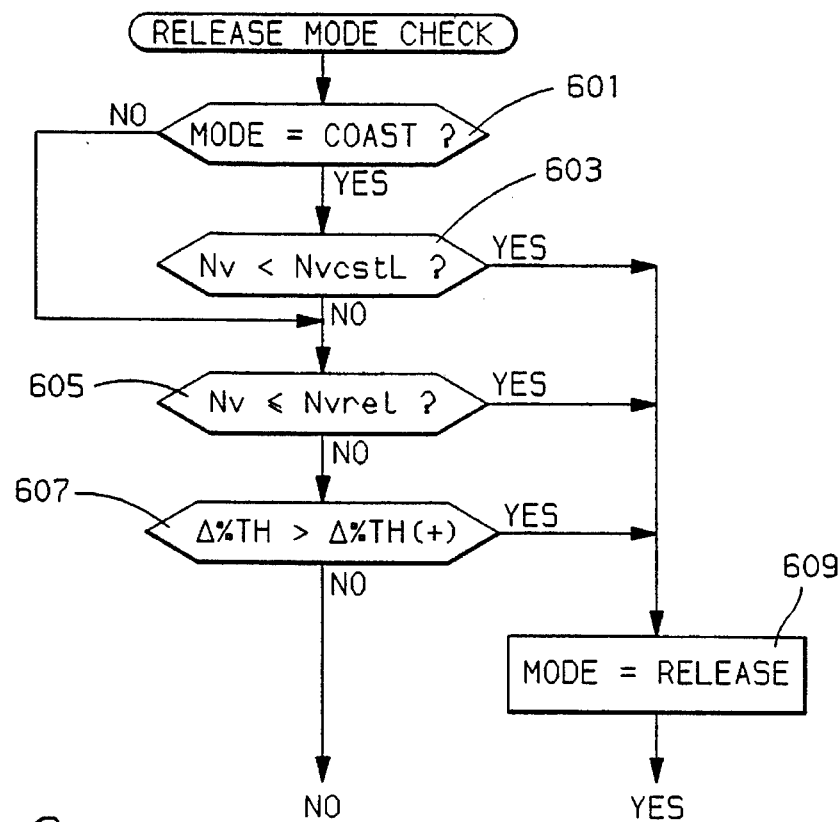
Figure 7:
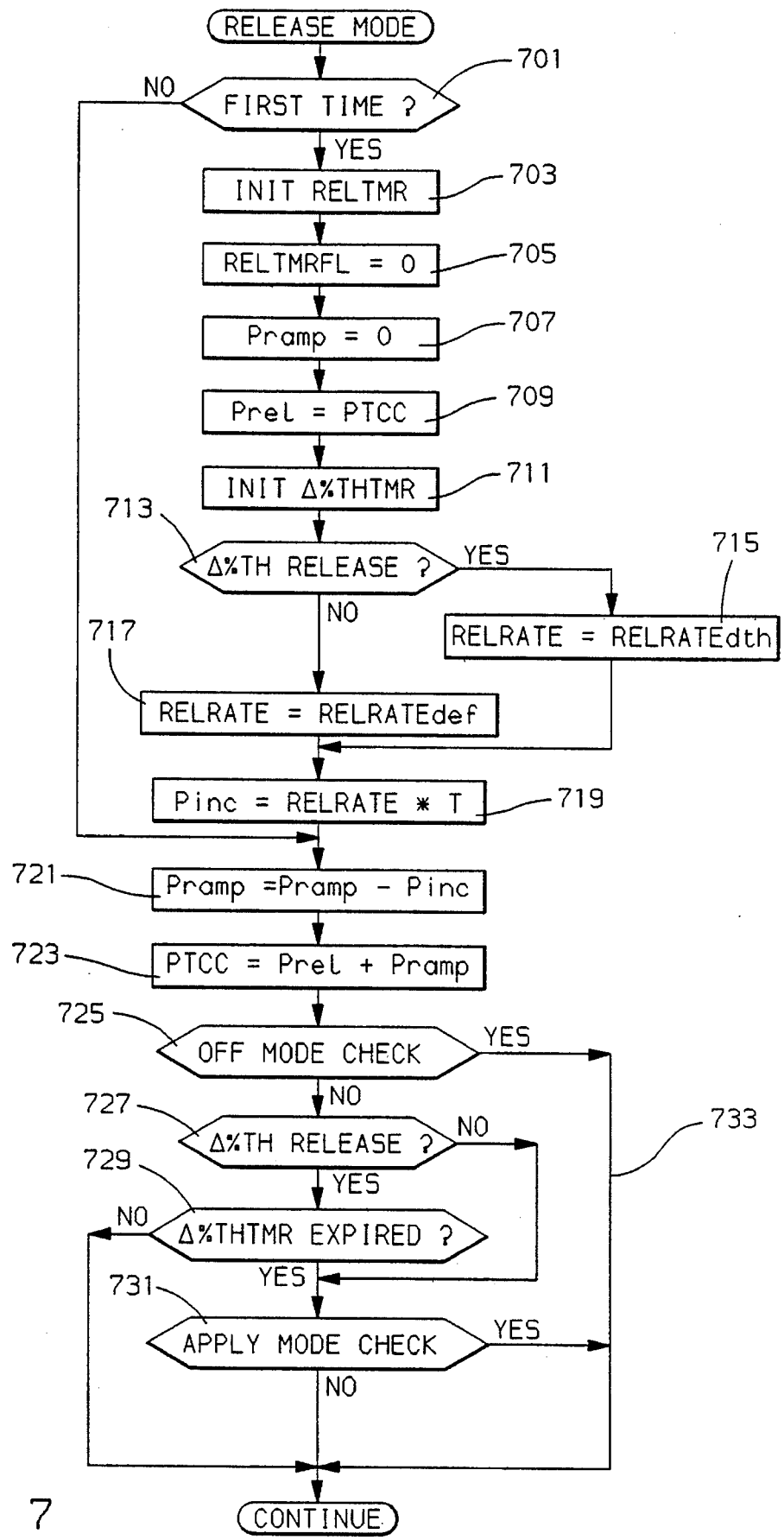

Referring to FIG. 6, various RELEASE mode criteria checks are performed in accordance with steps 601–609. A mode check is first performed at step 601 to determine whether COAST mode is active. Where COAST mode is active, step 603 is performed to determine if the vehicle speed is below a COAST mode vehicle speed threshold NvcstL thus indicating the desirability of exiting the COAST mode. Where COAST mode is not active or, where active, the vehicle speed threshold NvcstL is not crossed, step 605 is executed. Step 605 determines from the release line criteria whether the TCC should be released. If so, step 609 is executed to invoke the RELEASE mode. The last criteria in the RELEASE mode check determines if the rate of throttle position change Δ% TH exceeds a positive threshold Δ% TH(+) which would be consistent with operator demand for relatively aggressive acceleration and therefore a controlled release into the OFF mode where increase fluidic coupling will advantageously provide torque multiplication.

Where the RELEASE mode is the mode selected, the steps illustrated in FIG. 7 are executed to perform the control functions of the RELEASE mode. A first set of steps 701–719 are mode initialization steps; a second set of steps 721–723 are fluid pressure control and calculation steps; and, a third set of steps 725–731 are mode transition control steps. Step 701 is first encountered and determines whether RELEASE mode has just been initiated. A first time pass through the program steps will route control to steps 703–717 to initialize certain variables and timers used in the RELEASE mode control. RELTMR is initialized at a maximum release delay time at step 703 and RELTMRFL is initialized at zero. The timer and corresponding flag are used in the OFF mode check as previously described. The accumulation of fluid pressure adjustment Pramp is initialized to zero at step 707 and RELEASE mode baseline fluid pressure Prel is set, at step 709, to the terminal PTCC value from the mode being exited. Prel remains fixed thereafter throughout the RELEASE mode. Another timer, Δ% THTMR, is initialized at step 711 for use in delaying reapplication of the TCC too soon after initiating the RELEASE mode. Step 713 determines if the release is the result of a rate of throttle position change Δ% TH exceeding the positive threshold Δ% TH(+). If the release is due to a high rate of change in throttle position, step 715 sets the rate "RELRATE" at which accumulation of fluid pressure adjustments will occur in the RELEASE mode to a RELEASE mode delta throttle rate value "RELRATEdth". If, however, the release is not due to a high rate of change in throttle position, step 717 sets RELTATE to a RELEASE mode default rate value "RELRATEdef". Due to the nature of a throttle change RELEASE mode request, RELRATEdth is calibrated greater than RELRATEdef in order the torque multiplication attributes of the fluidic coupling are swiftly invoked upon the operator's demand. Next executed is step 719 wherein the unit fluid pressure adjustment (Pinc) is determined as a function of RELRATE and the period "T" of the control loop wherein adjustments are accumulated. Steps 721–731 are next executed as discussed below.

Passes subsequent the first pass through the RELEASE mode steps will begin at step 721 wherein the accumulation (Pramp) of fluid pressure adjustments (Pinc) occurs. In the RELEASE mode, the accumulation of fluid pressure adjustments is always such that Pramp represents a decreasing fluid pressure component of the net fluid pressure. Step 723 sets the net fluid pressure as the summation of the RELEASE mode baseline fluid pressure Prel and the accumulation of fluid pressure adjustments Pramp. The static nature of the baseline fluid pressure Prel and the decreasing nature of the accumulation of adjustments results in a substantially linear reduction in net fluid pressure through the RELEASE mode of operation in accordance with the rate selected at steps 713–717.

Steps 725–731 are next executed and represent the portion of RELEASE mode that controls transition thereof and initiation of an appropriate next mode. The OFF mode check as illustrated in FIG. 4 is executed at step 725 with an affirmative return therefrom resulting in bypassing the remaining steps 727–731 via line 733. A negative return from OFF mode check results in execution of step 727. If the RELEASE mode was entered because of a throttle change, step 729 checks if Δ% THTMR has expired, after which the APPLY mode check may be executed at step 731. If a throttle change did not invoke the present RELEASE mode, step 729 is bypassed and step 731 is immediately executed. RELEASE mode continues where no affirmative return from either mode checks 725,731 results from their respective executions.

Turning to FIG. 8, steps comprising the APPLY mode check are illustrated. Step 801 represent a determination whether the vehicle speed Nv has crossed the apply line as represented by Nvapp. A negative response does not result in the selection of the APPLY mode. An affirmative response results in execution of step 803 whereat measure slip ΔN is compared to the OFF mode slip threshold ΔNoff which, if exceeded, results in the selection of the APPLY mode at step 805. Measured slip below the threshold will not result in selection of the APPLY mode.

Figure 9:
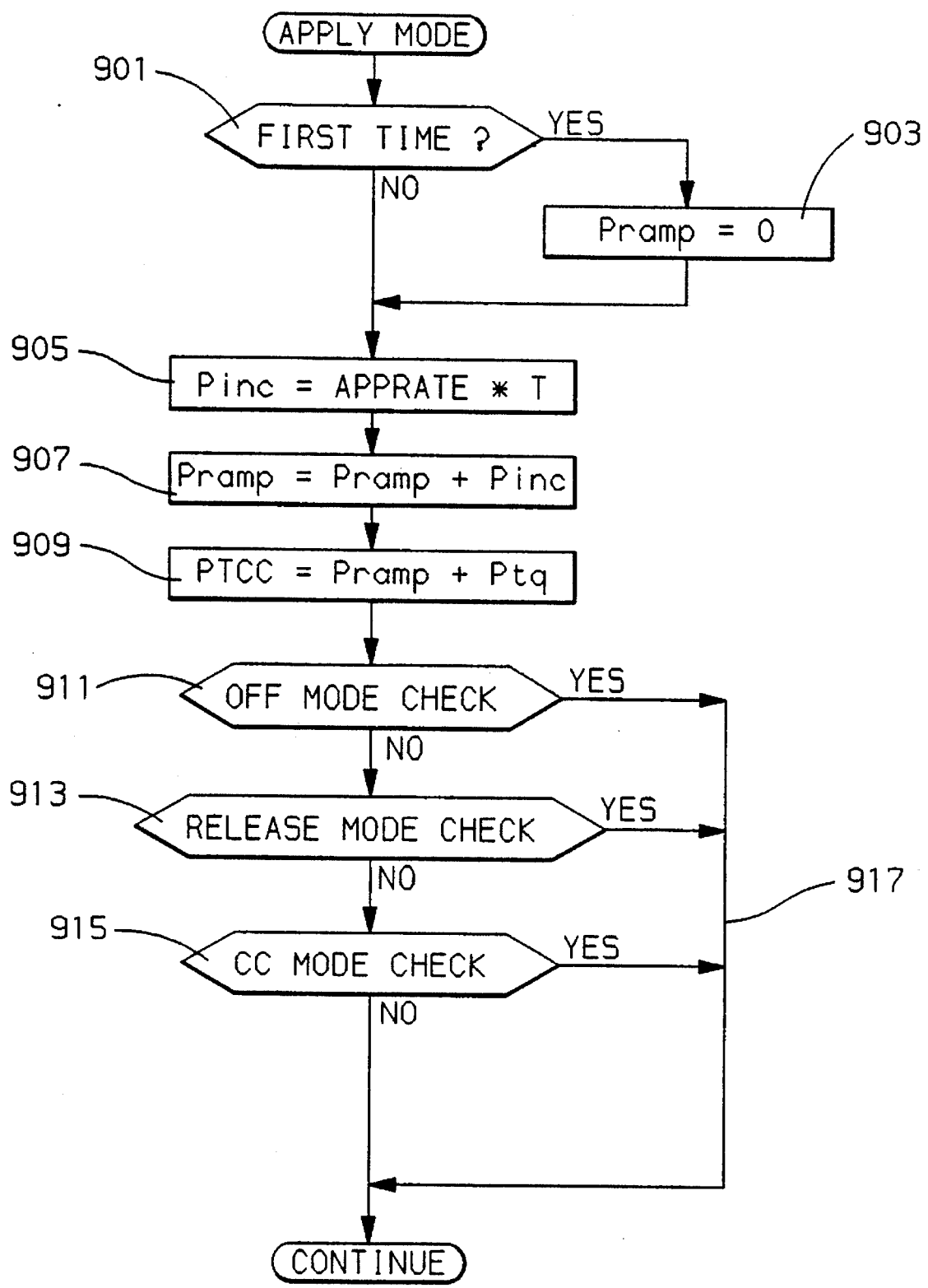

FIG. 9 illustrates steps executed during the APPLY mode. Again, a first set of steps 901–903 are mode initialization steps; a second set of steps 905–909 are fluid pressure control and calculation steps; and, a third set of steps 911–915 are mode transition control steps. Beginning at step 901, if the APPLY mode has just been initiated, step 903 is executed to initialize Pramp to zero; otherwise, control passes to step 905. Step 905 is then executed wherein the unit fluid pressure adjustment (Pinc) is determined as a function of APPRATE and the period "T" of the control loop wherein adjustments are accumulated. APPRATE is not static throughout the APPLY mode; rather, APPRATE is preferably a function of vehicle speed and looked up from a calibration table during an update of variables as described with respect to step 205 in FIG. 2. Preferably, the value of APPRATE will increase with increasing vehicle speeds as higher vehicle speeds tend to require larger application forces to maintain slip and therefore more aggressive rates to maintain a slip reduction in a desired time. Accumulation (Pramp) of fluid pressure adjustments (Pinc) occurs at step 907, the accumulation in the APPLY mode being such that Pramp represents an increasing fluid pressure component of the net fluid pressure. Step 909 next establishes the net fluid pressure PTCC as the summation of an APPLY mode baseline fluid pressure Ptq and the accumulation of fluid pressure adjustments Pramp. Ptq is the portion of the net fluid pressure represented as a function of engine torque and as such will be dynamic in its magnitude. A substantially constant engine torque will result in a PTCC which varies only with Pramp, thereby resulting in a substantially linear increase throughout such constant torque intervals in the APPLY mode of operation. However, in the event torque increase or decreases during the APPLY mode, PTCC will vary in accordance therewith. Such control of PTCC may result in increased or decreased rates of PTCC increases, or even decreases in PTCC during the APPLY mode. PTCC is thereby adjusted not only in response to the sense of slip but additionally in response to the actual engine torque.

Figure 10:
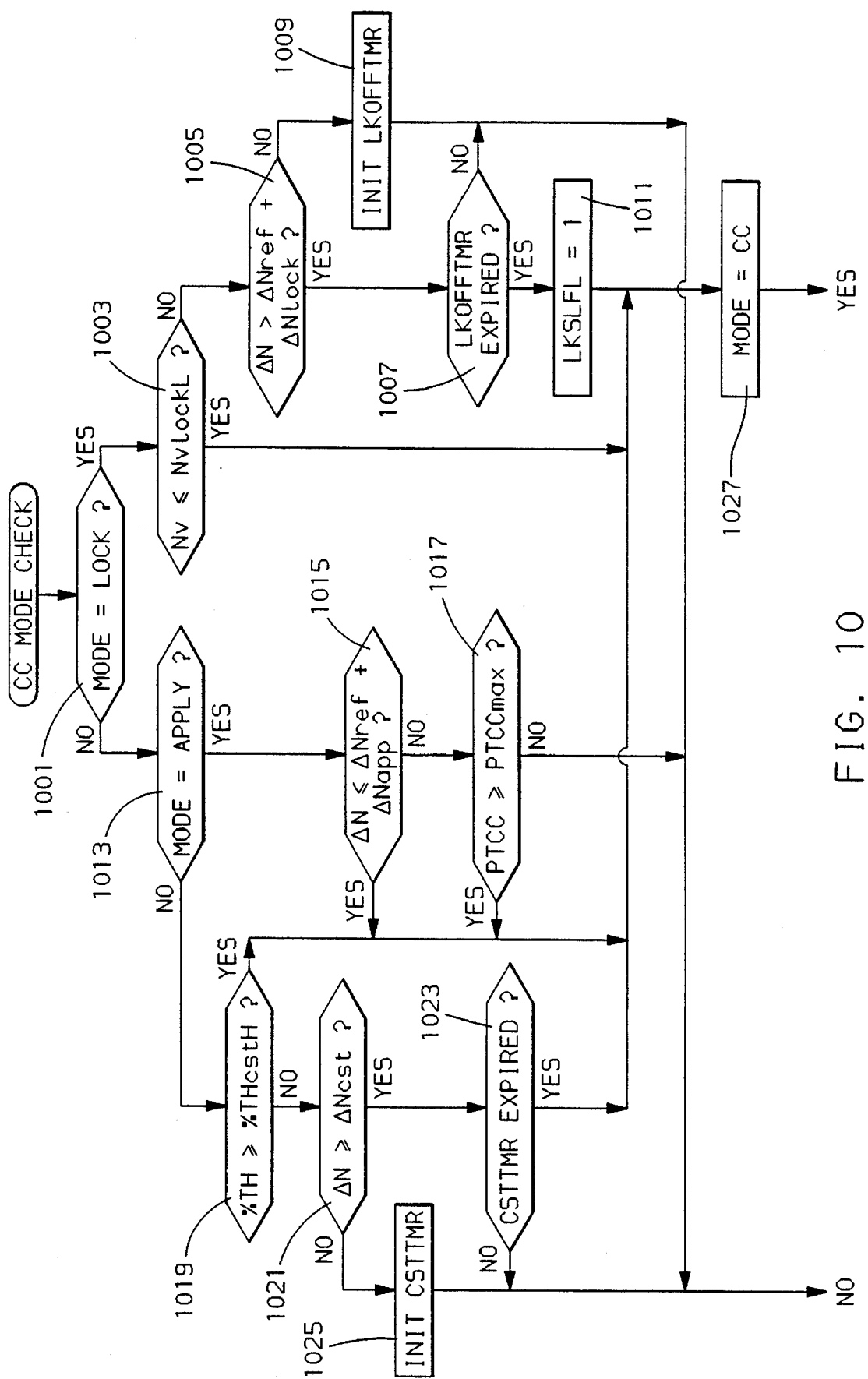

Steps 911–915 are next executed to perform OFF mode, RELEASE mode and CC mode checks as illustrated in detail in FIGS. 3, 6 and 10 respectively. Again, an affirmative return from any of the checks will result in selection of the corresponding mode and transition out of the APPLY mode. The first of the checks 911–915 resulting in an affirmative return will bypass the remaining checks via line 917.

Referring to the CC mode check as illustrated in FIG. 10, steps 1001–1027 are executed when the CC mode check is performed from various modes of operation. The entry into CC mode may occur from the APPLY mode, LOCK mode or COAST mode and steps 1001 and 1013 determine routing to appropriate steps within the CC mode check in accordance with the one of those modes executing the CC mode check. Step 1001 routes control to steps 1003–1011 if the CC mode check is caused to occur from the LOCK mode. Step 1013 routes control to steps 1015 and 1017 if the CC mode check is caused to occur from the APPLY mode. And, steps 1019–1025 are caused to occur by default where the CC mode check is caused to occur from the COAST mode.

Assuming that the current mode is the APPLY mode, step 1015 determines whether measured slip ΔN exceeds the APPLY mode slip threshold established as a summation of the reference slip ΔNref and the APPLY mode slip offset ΔNapp. An affirmative response to step 1015 indicates that the slip is sufficiently close to the reference slip to begin the CC mode and selects the CC mode at step 1027. A negative response at step 1015 results in the execution of step 1017 wherein the net fluid pressure PTCC is checked against a maximum allowable fluid pressure threshold (PTCCmax). Further adjustments in the APPLY mode to PTCC cannot be made if PTCCmax has been attained or exceeded and, therefor, CC mode will immediately be invoked based upon a maximum PTCC via execution of step 1027. An affirmative response at either steps 1015 or 1017 results in CC mode selection and an affirmative return to the mode transition control steps of the APPLY mode. Of course, negative responses to both steps 1015 and 1017 results in a negative return to the mode transition control steps of the APPLY mode without selection of the CC mode.

Assuming that the current mode is the LOCK mode, step 1003 determines if vehicle speed Nv exceeds a LOCK mode speed threshold NvlockL. If this lower limit on vehicle speed is no longer exceeded, then CC mode is selected at step 1027 and the CC mode check returns with an affirmative response to the mode transition control steps of the LOCK mode. Where the lower limit on vehicle speed continues to be exceeded, Pramp is initialized at the terminal value of PTCC in the LOCK mode. Step 1005 compares measured slip ZN to the LOCK mode termination slip threshold established as the summation of the reference slip ΔNref and the LOCK mode slip offset ΔNlock. If the threshold is not exceeded, then step 1009 initializes a timer "LKOFFTMR" which, if allowed to expire, indicates that slip has exceeded the LOCK mode termination slip threshold for a period of time sufficient to warrant return to CC mode in order to regain control of the TCC slip. LKOFFTMR is continually initialized in the LOCK mode by step 1009 so long as slip does not exceed the threshold at step 1005. Where slip does exceed the threshold, step 1007 determines if LKOFFTMR has expired. If it has not, then control returns via a negative return path to the mode transition control steps of the LOCK mode. Continuous operation in the LOCK mode wherein the slip threshold is exceeded results in expiration of LKOFFTMR and setting of a lock slip flag "LKSLFL" at step 1011, immediate selection of the CC mode at step 1027 and return via an affirmative return path to the mode transition control steps of the LOCK mode. LKSLFL will be utilized during the CC mode to establish certain initial control values and to forestall immediate selection of the LOCK mode.

Where the CC mode check is performed from the COAST, step 1019 first determines if the throttle position % TH exceeds the coast threshold (% Thcsth). Such a throttle position is indicative of the operator resuming positive engine torque delivery to the vehicle drivetrain and as such causes selection of CC mode at step 1027. Where the throttle position is still below the threshold, step 1021 is executed to determine if slip exceeds the COAST mode slip threshold $\Delta$Ncst. A negative response initializes a time CSTTMR at step 1025 which, if allowed to expire, indicates that slip has exceeded the COAST mode slip threshold for a period of time sufficient to warrant return to CC mode in order to regain control of the TCC slip. CSTTMR is continually initialized in the COAST mode by step 1025 so long as slip does not exceed the threshold at step 1021. Where slip does exceed the threshold, step 1023 determines if CSTTMR has expired. If it has not, then control returns via a negative return path to the mode transition control steps of the COAST mode. Continuous operation in the COAST mode wherein the slip threshold is exceeded results in expiration of CSTTMR, immediate selection of the CC mode at step 1027 and return via an affirmative return path to the mode transition control steps of the COAST mode.

Figure 11:
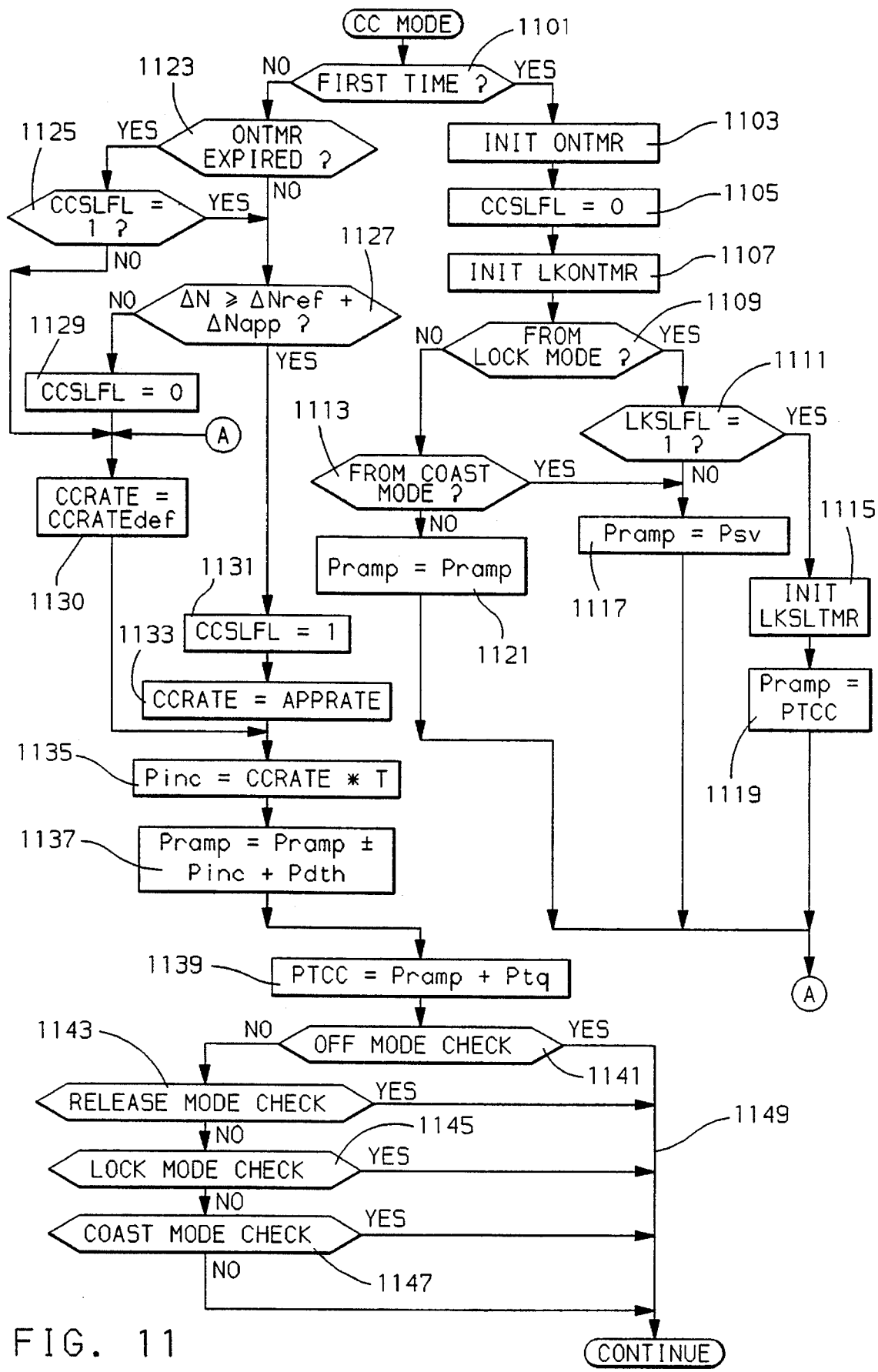

CC mode is next described with reference to the steps illustrated in FIG. 11. A first set of steps 1103–1121 are mode initialization steps; a second set of steps 1123–1139 are fluid pressure control and calculation steps; and, a third set of steps 1141–1147 are mode transition control steps.

Beginning at step 1101, if the CC mode has just been initiated, steps 1103 and 1105 are executed to initialize a timer "ONTMR" and slip flag "CCSLFL, respectively, for utilization in the identification and control of excessive slip during an initial period of CC mode operation. Step 1107 initializes a timer "LKONTMR" utilized in the LOCK mode check steps of FIG. 12 to control transition into the LOCK mode from the CC mode.

If the CC mode was invoked from the LOCK mode, step 1109 routes control to step 1111 whereat the lock slip flag LKSLFL is checked to determine if the LOCK mode was exited due to excessive slip. An affirmative response at step 1111 indicates that excessive slip caused the transition to the CC mode and delay timer "LKSLTMR" is initialized to forestall LOCK mode selection in accordance with the delay at step 1115. Since an excessive slip was determined to cause the transition from LOCK mode to CC mode, Pramp is initialized at the terminal value of net fluid pressure PTCC in the LOCK mode at step 1119 to advantageously capitalize on the additional capacity afforded by the LOCK mode fluid pressure offset Plock. Control continues to the fluid pressure control and calculation steps at step 1130.

If the CC mode was invoked from the COAST mode, step 1113 routes control to step 1117 whereat Pramp is initialized at the value Psv which is equivalent to the value of Pramp saved at the inception of the COAST mode. Control then continues to the fluid pressure control and calculation steps at step 1130.

If the CC mode was invoked from the APPLY mode, step 1121 is executed to initialize Pramp at the terminal value of Pramp in the APPLY mode. Once again, control continues to the fluid pressure control and calculation steps at step 1130.

Passes subsequent the first pass through the CC mode steps will begin at step 1123 wherein ONTMR is checked for expiration. Where ONTMR has not yet expired, step 1127 is executed to determine if slip $\Delta$N exceeds the APPLY mode slip threshold established as a summation of the reference slip $\Delta$Nref and the APPLY mode slip offset $\Delta$Napp. This condition may be experienced where an increasing slip is present upon initiation of the CC mode. Where the threshold is exceeded, slip flag CCSLFL is set at step 1131 for future use in selecting an appropriate fluid pressure adjustment rate. The rate "CCRATE" at which accumulation of fluid pressure adjustments will occur in the CC mode is then set to APPRATE. APPRATE represents more aggressive fluid pressure adjustments than a CC mode default rate "CCPATEdef" otherwise utilized. Additionally, since APPRATE is variable in accordance with vehicle speed, too aggressive fluid pressure adjustments are not likely. APPRATE will continue to be used in the CC mode until slip is controlled below the threshold ($\Delta$Nref+$\Delta$Napp).

Referring back to step 1123, where ONTMR has expired, step 1125 is executed. If the slip flag CCSLFL was set previously, then slip will continue to be checked at step 1127. Once slip is under control, step 1127 will route control to step 1129 whereat CCSLFL is reset to prevent further usage of the more aggressive fluid pressure adjustments. Therefor, where ONTMR has expired and CCSLFL is reset, step 1130 sets CCRATE to the default CCRATEdef.

After steps 1123–1133 determine the appropriate CCRATE, step 1135 is executed wherein the unit fluid pressure adjustment (Pinc) is determined as a function of CCRATE and the period "T" of the control loop wherein adjustments are accumulated. At step 1137, Pramp is established as the previous Pramp and an addition or subtraction of Pinc where the measured slip $\Delta$N is above or below the reference slip $\Delta$Nref respectively. Additionally, an adjustment to PTCC may be made in accordance with a change in throttle position to ensure that rapid throttle position changes do not cause undesirable full application of the TCC in the case of stepping out of the throttle and to provide for an additional slip margin in the case of stepping into the throttle. By providing adjustment to PTCC in response to negative throttle changes, the control makes downward adjustments to PTCC by a calibration substantially proportional to the rapidity of the throttle change thereby providing an additional margin of slip by virtue of a stepwise pressure reduction to prevent unintended full application of the TCC. Similarly, by providing adjustment to PTCC in response to positive throttle changes, the control also makes downward adjustments to PTCC by a calibration substantially proportional to the rapidity of the throttle change thereby providing an additional margin of slip by virtue of a stepwise pressure reduction to provide additional torque coupling and attendant torque multiplication through the hydrodynamics of the torque converter. This adjustment is shown as a delta throttle pressure "Pdth" in step 1137. Ultimately, step 1139 establishes PTCC as the summation a CC mode baseline fluid pressure Ptq and the accumulation of fluid pressure adjustments Pramp. As discussed with reference to the APPLY mode, Ptq is the portion of the net fluid pressure represented as a function of engine torque and as such will be dynamic in its magnitude. A substantially constant engine torque will result in a PTCC which varies only with Pramp, thereby resulting in a substantially linear increase throughout such constant torque intervals in the CC mode of operation. However, in the event torque increase or decreases during the CC mode, PTCC will vary in accordance therewith. Such control of PTCC may result in increased or decreased rates of PTCC increases, or even decreases in PTCC during the CC mode. PTCC is thereby adjusted not only in response to the sense of slip but additionally in response to the actual engine torque.

Steps 1141–1147 are next executed to perform OFF mode, RELEASE mode, LOCK mode and COAST mode checks as illustrated in detail in FIGS. 3, 6, 12 and 14 respectively. An affirmative return from any of the checks will result in selection of the corresponding mode and transition out of the CC mode. The first of the checks 1143–1147 resulting in an affirmative return will bypass the remaining checks via line 1149.

Figure 12:
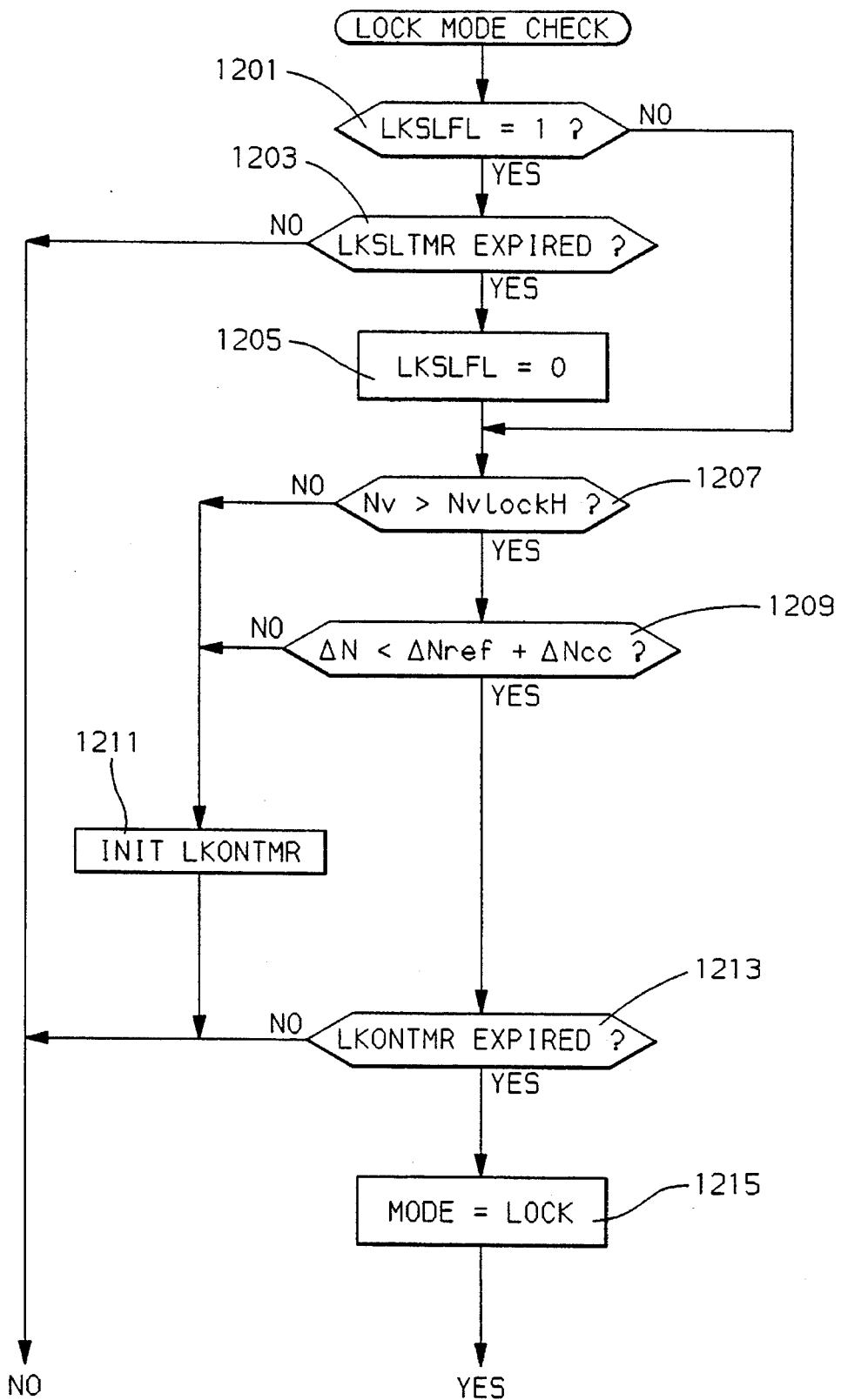

Referring to FIG. 12, steps comprising the LOCK mode checks are illustrated. These steps are executable only from the CC mode since the LOCK mode in the present embodiment is accessible only therefrom. Step 1201 is first executed whereat LKSLFL is checked to determine if the most recent transition out of the LOCK mode into the CC mode was due to excessive slip. An affirmative response at step 1201 indicates that excessive slip caused the transition to the CC mode and delay timer LKSLTMR is therefore checked for expiration at step 1203. An unexpired LKSLTMR indicates that it is premature to initiate LOCK mode and therefore will bypass further LOCK mode checks and exit the LOCK mode check via the negative return path. Where, however, LKSLTMR has expired, LKSLFL is reset to allow future processing through the LOCK mode check to proceed. Therefore, step 1207 is executed in this and future passes through the LOCK mode check steps.

Step 1207 represents the first criteria check for entering the LOCK mode whereat vehicle speed Nv is compared to the LOCK mode vehicle speed threshold NvlockH. A negative response threat will initialize timer LKONTMR in response to the vehicle speed dropping below the threshold. If step 1207 is affirmatively answered, the vehicle speed is above the threshold and the timer LKONTMR is allowed to continue toward expiration. Step 1209 then checks the slip against the LOCK mode initiation slip threshold established as the summation of the reference slip ΔNref and the CC mode slip offset ΔNcc. If this too results in an affirmative response, step 1213 is executed. However, is step 1209 results in a negative response where slip is too high for LOCK mode activation, step 1211 initializes LKONTMR. Step 1213, which is reached upon satisfactory criteria checks at steps 1207 and 1209, check if the LKONTMR has expired. An expired timer threat indicates that the criteria check have passed for an adequate period of time and that LOCK mode may be initiated. Therefore, step 1215 is allowed to set the mode to LOCK mode and return control via the affirmative return path to the mode transition control steps in the CC mode.

Figure 13:
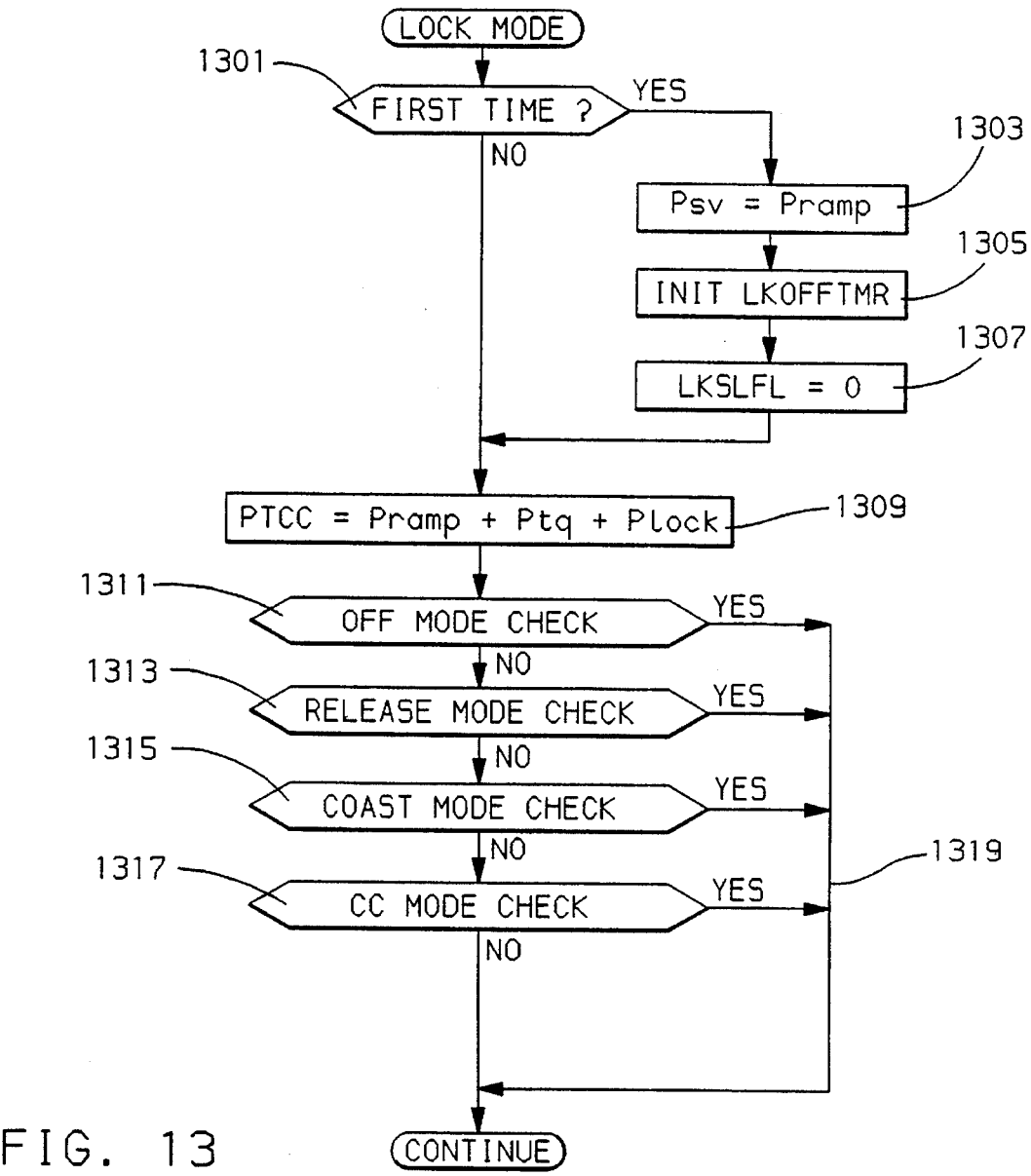

The LOCK mode steps are illustrated in FIG. 13 and comprise a set of initialization steps 1301–1307; a fluid pressure control and calculation step 1309; and, a set of mode transition control steps 1311–1317.

Beginning at step 1301, if the LOCK mode has just been initiated, steps 1303–1307 are executed to, respectively, save the terminal value of Pramp, in the CC mode from which the transition to LOCK mode occurred, initialize the timer LKOFFTMR, and reset the lock slip flag LKSLFL.

PTCC is then established at step 1309 as the summation of Pramp, the LOCK mode baseline fluid pressure Ptq and a LOCK mode fluid pressure step Plock. Again, the baseline fluid pressure Ptq is the portion of the net fluid pressure represented as a function of engine torque and as such will be dynamic in its magnitude. A substantially constant engine torque will result in a PTCC which remains constant throughout the LOCK mode since the other pressure contributions, Pramp and Plock, are static throughout the LOCK mode. However, in the event torque increase or decreases during the LOCK mode, PTCC will vary in accordance therewith. Such control of PTCC may result in PTCC increases, or decreases in PTCC during the LOCK mode. PTCC is thereby adjusted only in response to the actual engine torque.

Steps 1311–1317 are next executed to perform OFF mode, RELEASE mode, COAST mode and CC mode checks as illustrated in detail in FIGS. 3, 6, 14 and 10 respectively. An affirmative return from any of the checks will result in selection of the corresponding mode and transition out of the LOCK mode. The first of the checks 1311–1317 resulting in an affirmative return will bypass the remaining checks via line 1319.

Figure 14:
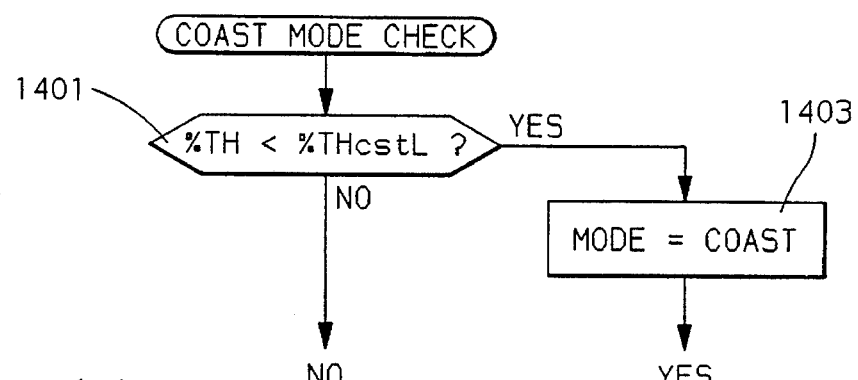

The steps illustrated in FIG. 14 are executed as the COAST mode check from the CC mode or the LOCK mode. Step 1401 determines the propriety of entering the COAST mode by comparing the present throttle position %TH to the COAST throttle threshold %THcstL. This minimum throttle setting, if crossed, will result in an affirmative response at block 1401 and selection of the COAST mode at step 1403 and thereafter return via the affirmative return line to the transition control steps of the one of the CC and LOCK modes executing the COAST mode checks. A negative response to step 1401 returns via the negative return line.

Figure 15:
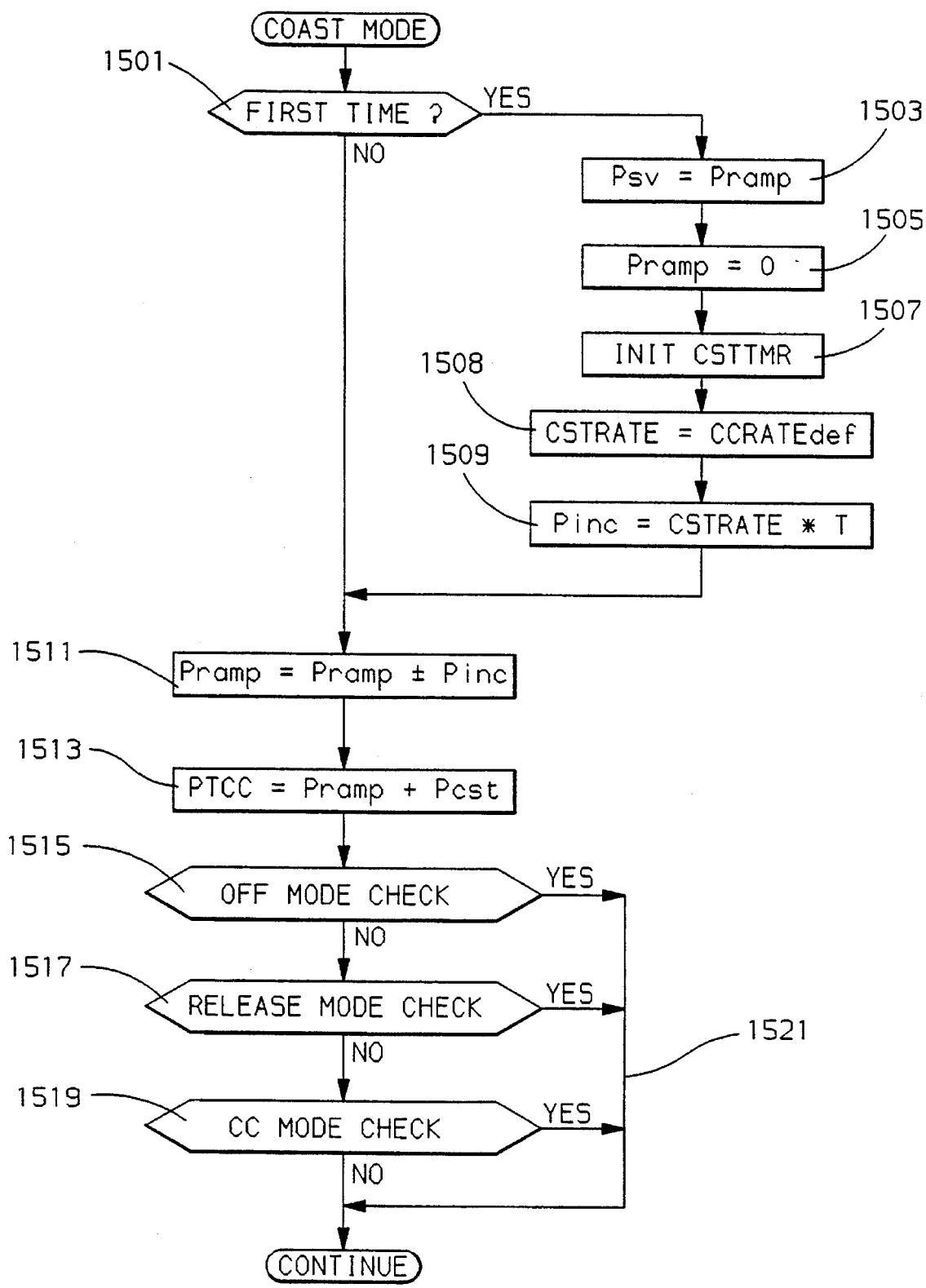

The COAST mode steps are illustrated with reference to FIG. 15. A set of initialization steps 1501–1509, a set of fluid pressure control and calculation steps 1511 and 1513, and a set of mode transition control steps 1515–1519 comprise the COAST mode. Step 1501 is first executed and, at the initial pass through the steps, routes control to step 1503–1509 to establish initial variable and timer values as utilized throughout the remaining passes through the COAST mode steps. Psv is initialized at the terminal value of Pramp in the CC mode or LOCK mode at transition therefrom at step 1503. Pramp is then set to zero at step 1505 so that accumulations will begin from that value. Timer CSTTMR, used in conjunction with CC mode transitions as detailed in FIG. 10, is initialized at step 1507, and the CSTRATE at which accumulation of fluid pressure adjustments will occur in the COAST mode is then set to the default value for the accumulation of fluid pressure adjustments in the CC mode, i.e. CSTRATEdef. Thereafter, the unit fluid pressure adjustment (Pinc) is determined as a function of CSTRATE and the period "T" of the control loop wherein adjustments are accumulated.

Control next passes to step 1511 wherein Pramp is recalculated with the addition or subtraction of Pinc depending upon the magnitude of the measured slip with respect to the reference slip so as to control slip, both negative and positive, during the COAST mode. From here, step 1513 establishes the net fluid pressure PTCC as the summation of Pramp and a COAST mode baseline fluid pressure "Pcst" which is a function of torque converter output member speed.

The transition control steps 1515–1519 are next executed and the first of such steps encountered to be affirmatively answered cause bypass of the remaining steps.

While the present invention has been described with respect to certain preferred embodiments, it is to be understood that various modifications and alternatives thereto may be readily practiced within the scope and spirit of the invention which is defined by the appended claims.

The embodiments of the invention in which an exclusive property or privilege is claimed are defined as follows:

1. In a motor vehicle including a fluidic torque converter adapted to transmit torque between an input member thereof coupled to an engine output shaft and an output member thereof coupled to a vehicle drivetrain, the torque being positive when the engine is driving the vehicle drivetrain and negative when the vehicle drivetrain is driving the engine, a variable torque capacity clutch mechanism connected between the input and output members of said torque converter wherein clutch slip is positive when the input member rotational speed exceeds the output member rotational speed and negative when the output member rotational speed exceeds the input member rotational speed, and a clutch actuating mechanism for controlling the torque capacity of said clutch according to the net fluid pressure differential thereacross, a torque converter clutch control comprising:

control means for establishing a pressure control signal in response to a plurality of vehicle control inputs for controlling the clutch actuating mechanism in one of a plurality of modes of operation;

an off mode of operation wherein said pressure control signal causes substantially zero pressure differential across said clutch mechanism to cause substantially zero clutch torque capacity;

an apply mode of operation operable during periods of positive torque for transitioning from the off mode of operation to a controlled capacity mode of operation, wherein during said apply mode of operation the pressure control signal varies to cause positive slip to decrease toward a reference slip;

a controlled capacity mode of operation wherein the pressure control signal varies to increase and decrease the pressure differential across the clutch mechanism to maintain the clutch mechanism slip substantially at said reference slip, said pressure control signal comprising a summation of a torque adaptive quantity which value varies with a predetermined correlation to a measure of engine output torque and a slip adaptive quantity whose value varies in a first predetermined direction and a second predetermined direction when the clutch mechanism positive slip is respectively greater than and less than the reference slip; and a release mode of operation for transitioning from the controlled capacity mode of operation to the off mode of operation wherein during said release mode of operation the pressure control signal varies to decrease the pressure differential across the clutch mechanism to cause clutch torque capacity to decrease.

2. A torque converter clutch control as claimed in claim 1 further comprising a lock mode of operation accessible from said controlled capacity mode of operation wherein during said lock mode of operation the pressure control signal controls the pressure differential across said clutch mechanism to provide torque capacity at least as great as the torque being transmitted between said input and output members, said pressure control signal comprising a summation of said torque adaptive quantity, the controlled capacity mode of operation final value of said slip adaptive quantity, and a predetermined lock quantity, and wherein the release mode of operation is further adapted for transitioning from the lock mode of operation to the off mode of operation.

3. A torque converter clutch control as claimed in claim 1 further comprising a coast mode of operation accessible from said controlled capacity mode of operation wherein during said coast mode of operation the pressure control signal varies to increase and decrease the pressure differential across the clutch mechanism to maintain the absolute value of clutch mechanism slip substantially at said reference slip, said pressure control signal comprising a summation of a drivetrain member speed adaptive quantity whose value varies with a predetermined correlation to a measure of a drivetrain member speed and a slip adaptive quantity whose value varies in a first predetermined direction and a second predetermined direction when the absolute value of clutch mechanism slip is respectively greater than and less than the reference slip.

4. A torque converter clutch control as claimed in claim 1 wherein during said apply mode of operation the pressure control signal comprises a summation of said torque adaptive quantity and an apply quantity that varies monotonically at a predetermined rate.

5. A torque converter clutch control as claimed in claim 1 wherein during said controlled capacity mode of operation the pressure control signal further comprises in summation therewith a transient throttle quantity that varies with a predetermined correlation to the rate of change in throttle position.

6. In a motor vehicle including a fluidic torque converter adapted to transmit torque between an input member thereof coupled to an engine output shaft and an output member thereof coupled to a vehicle drivetrain, the torque being positive when the engine is driving the vehicle drivetrain and negative when the vehicle drivetrain is driving the engine, a variable torque capacity clutch mechanism connected between the input and output members of said torque converter wherein clutch slip is positive when the input member rotational speed exceeds the output member rotational speed and negative when the output member rotational speed exceeds the input member rotational speed, and a clutch actuating mechanism for controlling the torque capacity of said clutch according to the net fluid pressure differential thereacross, a torque converter clutch control comprising:

control means for establishing a pressure control signal in response to a plurality of vehicle control inputs for controlling the clutch actuating mechanism in one of a plurality of modes of operation;

an off mode of operation wherein said pressure control signal causes substantially zero pressure differential across said clutch mechanism to cause substantially zero clutch torque capacity;

an apply mode of operation operable during periods of positive torque for transitioning from the off mode of operation to a controlled capacity mode of operation, wherein during said apply mode of operation the pressure control signal varies to increase the pressure differential across the clutch mechanism to cause clutch torque capacity to increase and positive slip to decrease toward a reference slip;

a controlled capacity mode of operation wherein the pressure control signal varies to increase and decrease the pressure differential across the clutch mechanism to maintain the clutch mechanism slip substantially at said reference slip, said pressure control signal comprising a summation of a torque adaptive quantity whose value varies with a predetermined correlation to a measure of engine output torque and a slip adaptive quantity whose value varies in a first predetermined direction and a second predetermined direction when the clutch mechanism positive slip is respectively greater than and less than the reference slip;

a lock mode of operation accessible from said controlled capacity mode of operation wherein during said lock mode of operation the pressure control signal controls the pressure differential across said clutch mechanism to provide torque capacity at least as great as the torque being transmitted between said input and output members, said pressure control signal comprising a summation of said torque adaptive quantity, the controlled capacity mode of operation final value of said slip adaptive quantity, and a predetermined lock quantity;

a coast mode of operation accessible from said controlled capacity and lock modes of operation wherein during said coast mode of operation the pressure control signal varies to increase and decrease the pressure differential across the clutch mechanism to maintain the absolute value of clutch mechanism slip substantially at said reference slip, said pressure control signal comprising a summation of a drivetrain member speed adaptive quantity whose value varies with a predetermined correlation to a measure of a drivetrain member speed quantity and a slip adaptive quantity whose value varies in a first predetermined direction and a second predetermined direction when the absolute value of clutch mechanism slip is respectively greater than and less than the reference slip; and a release mode of operation for transitioning from the controlled capacity, lock and coast modes of operation to the off mode of operation wherein during said release mode of operation the pressure control signal varies to decrease the pressure differential across the clutch mechanism to cause clutch torque capacity to decrease.

* * * * *